United States Patent
Gary et al.

(10) Patent No.: US 11,828,518 B2
(45) Date of Patent: Nov. 28, 2023

(54) REFRIGERATION APPLIANCE FAN

(71) Applicant: WHIRLPOOL CORPORATION, Benton Harbor, MI (US)

(72) Inventors: Adam Gary, Marco Island, FL (US); Keeley Kabala, Elgin, IL (US); Raghu Muddasani, Iowa City, IA (US); Jeremiah S. Papke, Shelby Township, MI (US); Kyle Van Meter, Coralville, IA (US); Scott M. Wesbrook, Cedar Rapids, IA (US)

(73) Assignee: Whirlpool Corporation, Benton Harbor, MI (US)

( * ) Notice: Subject to any disclaimer, the term of this patent is extended or adjusted under 35 U.S.C. 154(b) by 371 days.

(21) Appl. No.: 17/082,381

(22) Filed: Oct. 28, 2020

(65) Prior Publication Data

US 2021/0041157 A1  Feb. 11, 2021

Related U.S. Application Data

(63) Continuation-in-part of application No. 15/377,455, filed on Dec. 13, 2016, now Pat. No. 10,837,694.

(51) Int. Cl.
*F25D 17/06* (2006.01)
*F25C 5/20* (2018.01)

(52) U.S. Cl.
CPC ............. *F25D 17/065* (2013.01); *F25C 5/22* (2018.01); *F25C 2400/10* (2013.01); *F25D 2317/061* (2013.01)

(58) Field of Classification Search
CPC .... F25D 17/065; F25D 2317/061; F25C 5/22; F25C 2400/10
See application file for complete search history.

(56) References Cited

U.S. PATENT DOCUMENTS 3,359,755 A  12/1967 Creech
5,165,252 A  11/1992 Hannibalsen
(Continued)

FOREIGN PATENT DOCUMENTS

CN  102494460 A  6/2012
EP     3147603 A1  3/2017
(Continued)

OTHER PUBLICATIONS

Coast Appliance Parts, Whirlpool WRF990SLAW00 Parts List, accessed Oct. 7, 2020, https://www.coastparts.com/lookup/220139/1499130#diagram.
(Continued)

*Primary Examiner* — Elizabeth J Martin
(74) *Attorney, Agent, or Firm* — Price Heneveld LLP

(57) ABSTRACT

A refrigeration appliance includes a freezer compartment fluidly coupled to an ice maker compartment via an ice maker return duct. An internal sensor is positioned within the freezer compartment and configured to sense a first condition within the freezer compartment. An external sensor is coupled to said refrigeration appliance and configured to sense a second condition external to said refrigeration appliance. A return fan is positioned within the ice maker return duct. A controller is operably coupled to the internal and external sensors to receive sensed first and second conditions. The controller is configured to determine a differential between the sensed first condition within the freezer compartment and the sensed second condition external to said refrigeration appliance. The controller activates the return fan to blow air from the ice maker compartment into the freezer compartment in response to the differential.

13 Claims, 18 Drawing Sheets

(56) References Cited

U.S. PATENT DOCUMENTS

| | | | |
|---|---|---|---|
| 6,176,776 B1 | 1/2001 | Finkelstein et al. | |
| 6,672,094 B1 | 1/2004 | Carden et al. | |
| 7,726,754 B2 | 6/2010 | Keller et al. | |
| 8,186,173 B2 | 5/2012 | Schropp et al. | |
| 2006/0260345 A1 | 11/2006 | Coulter et al. | |
| 2007/0261424 A1 | 11/2007 | Wang | |
| 2009/0320515 A1 | 12/2009 | Bischofberger et al. | |
| 2010/0077775 A1 | 4/2010 | Smith et al. | |
| 2010/0077778 A1 | 4/2010 | Kim | |
| 2014/0034157 A1 | 2/2014 | Kwon | |
| 2014/0060106 A1* | 3/2014 | Van Meter | F25C 1/04 62/340 |
| 2016/0054046 A1 | 2/2016 | Sim | |
| 2016/0290713 A1 | 10/2016 | Twigger, III et al. | |
| 2016/0370091 A1* | 12/2016 | Koo | F25D 17/065 |
| 2018/0216867 A1* | 8/2018 | Mynderse | F25C 5/22 |

FOREIGN PATENT DOCUMENTS

| | | |
|---|---|---|
| JP | H06137750 A | 5/1994 |
| JP | H08327215 A | 12/1996 |
| WO | 2015128165 A1 | 9/2015 |

OTHER PUBLICATIONS

Coast Appliance Parts, Whirlpool WRF990SLAW00 Parts List, accessed Oct. 7, 2020, https://www.coastparts.com/lookup/220139/1568964#diagram.

Amre Supply, Whirlpool Refrigerator Ice Maker Icebox Adapter Kit, accessed Oct. 28, 2020, https://www.amresupply.com/part/12491809.

* cited by examiner

REFRIGERATION APPLIANCE FAN

CROSS-REFERENCE TO RELATED APPLICATIONS

This application is a continuation-in-part of U.S. patent application Ser. No. 15/377,455, filed on Dec. 13, 2016, now U.S. Pat. No. 10,837,694, entitled "REFRIGERATION APPLIANCE FAN," the disclosure to which is hereby incorporated herein by reference in its entirety.

FIELD

The present disclosure generally relates to refrigeration appliances, and more particularly, to refrigeration appliances incorporating fans for preventing frost buildup within freezer compartments.

BACKGROUND

Freezer compartments within refrigeration appliances may experience a pressure differential relative to the surroundings of the refrigeration appliance due to the cooling and circulation of air within the appliance. Such a pressure differential may result in warm and/or humid air entering the freezer compartment. Warm or humid air entering the freezer compartment may result in the formation of frost and ice accumulation. Further, pressure differentials may increase the force required to open a door of the appliance.

SUMMARY OF THE DISCLOSURE

According to one feature of the present disclosure, a refrigeration appliance includes a freezer compartment and an ice maker compartment. An ice maker return duct is fluidly coupled to the ice maker compartment and the freezer compartment and is configured to direct air from the ice maker compartment to the freezer compartment. An internal sensor is positioned within the freezer compartment and configured to sense a first condition within the freezer compartment. An external sensor is coupled to said refrigeration appliance and configured to sense a second condition external to said refrigeration appliance. A return fan is positioned within the ice maker return duct. A controller is operably coupled to the internal and external sensors to receive sensed first and second conditions. The controller is configured to determine a differential between the sensed first condition within the freezer compartment and the sensed second condition external to said refrigeration appliance. The controller activates the return fan to blow air from the ice maker compartment into the freezer compartment in response to the differential.

According to another feature of the present disclosure, a refrigeration appliance includes an outer wrapper. A refrigeration liner is disposed within the outer wrapper and defines a refrigeration compartment. The refrigeration liner defines at least one first slot and at least one second slot. The at least one first slot is disposed proximate a first sidewall and the at least one second slot is disposed proximate a second sidewall. A freezer liner is disposed within the outer wrapper and defines a freezer compartment. The freezer liner defines a first aperture in fluid communication of the at least one first slot and a second aperture in fluid communication with the at least one second slot. A first air duct is fluidly coupled to the at least one first slot and the first aperture. A second air duct is fluidly coupled to the at least one second slot and the second aperture. An ice maker compartment is disposed within the refrigeration compartment. The ice maker compartment is in fluid communication with the freezer compartment. A machine compartment is defined at least partially by the outer wrapper. The machine compartment includes a first evaporator for cooling air within the freezer compartment and a second evaporator for cooling air within the refrigeration compartment.

According to yet another feature of the present disclosure, a method of servicing a refrigeration appliance includes removing an ice maker compartment to access a wiring harness. An ice maker fan is disconnected from the wiring harness. A Y-splitter is coupled to the wiring harness. The ice maker fan and a return fan are coupled to the wiring harness. An air pressure differential is sensed between a freezer compartment and an area external to said refrigeration appliance. The ice maker fan and the return fan are deactivated.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

DETAILED DESCRIPTION

Figure 1:
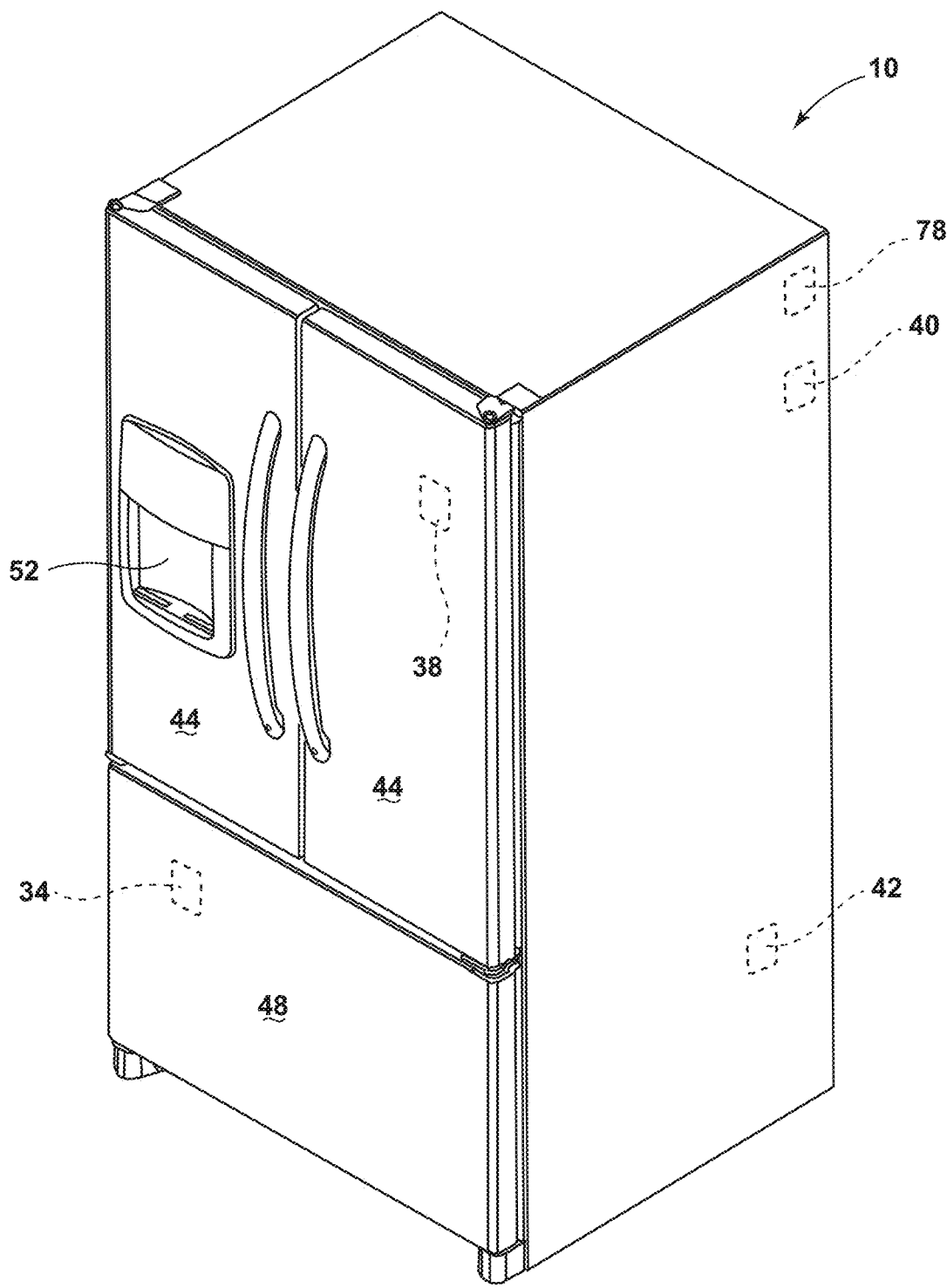
FIG. 1 is a perspective view of a French-door bottom-mount refrigeration appliance, according to one example.

For purposes of description herein, the terms "upper," "lower," "right," "left," "rear," "front," "vertical," "horizontal," and derivatives thereof, shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring now to FIGS. 1-18, reference numeral 10 generally designates a refrigeration appliance 10 including a freezer compartment 14 and a refrigeration compartment 18. An ice maker compartment 22 may be positioned outside of the freezer compartment 14. An ice maker supply duct 26 and an ice maker return duct 30 fluidly couple the ice maker compartment 22 with the freezer compartment 14. A pressure sensor 34 is positioned within the freezer compartment 14. The sensor 34 may be configured to detect a pressure differential between the freezer compartment 14 and an external environment (e.g., the atmosphere) to the refrigeration appliance 10. A fan 38 is positioned within the ice maker return duct 30. The fan 38 may be configured to be activated when the pressure within the freezer compartment 14 is lower than the external environment (i.e., a negative pressure is sensed within the freezer compartment 14). A controller 40 may be electrically coupled to the fan 38 and the sensor 34 for activating the fan 38.

Figure 2:
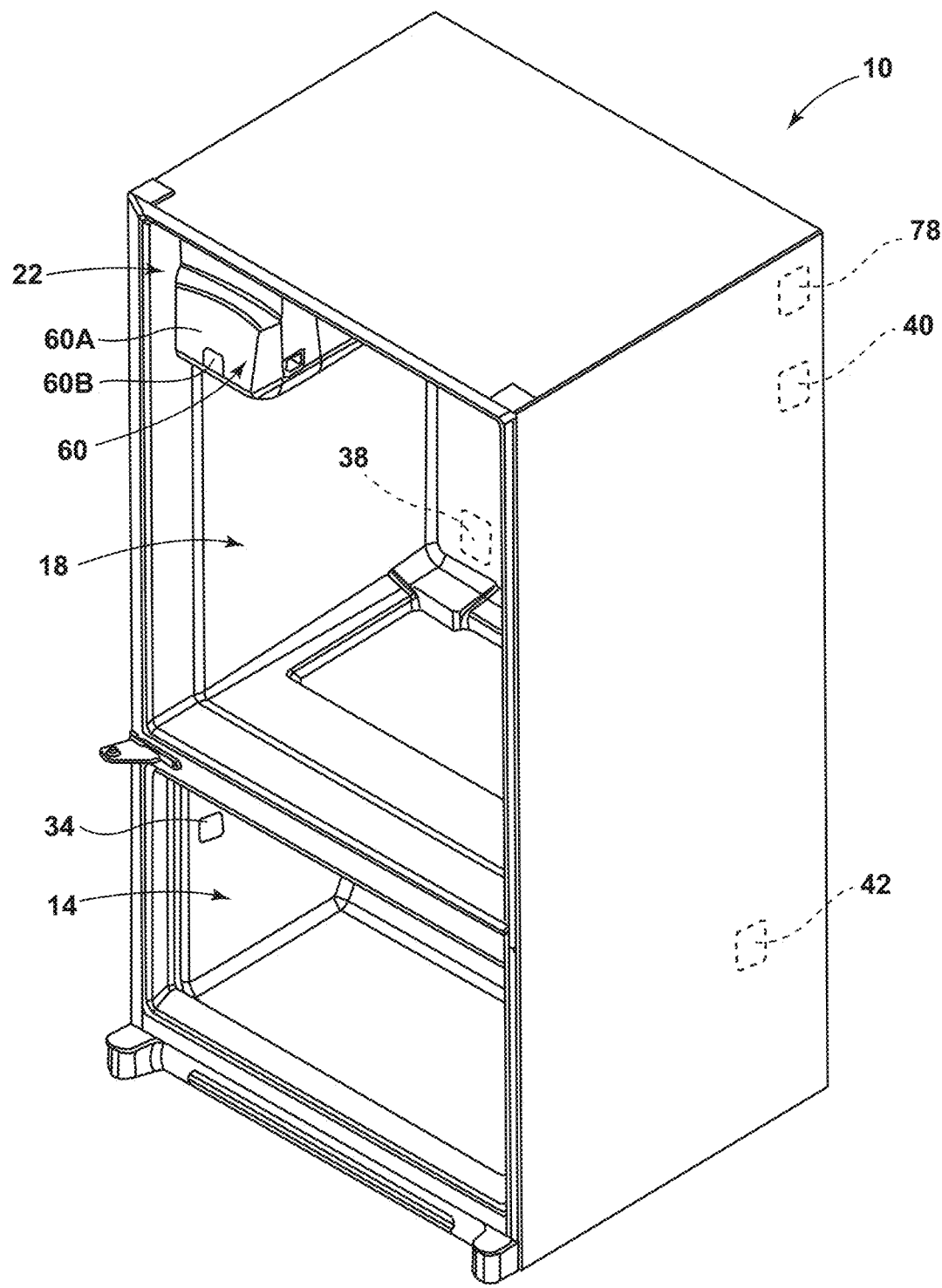
FIG. 2 is a perspective view of the refrigeration appliance having its doors removed, according to one example.
Figure 3:
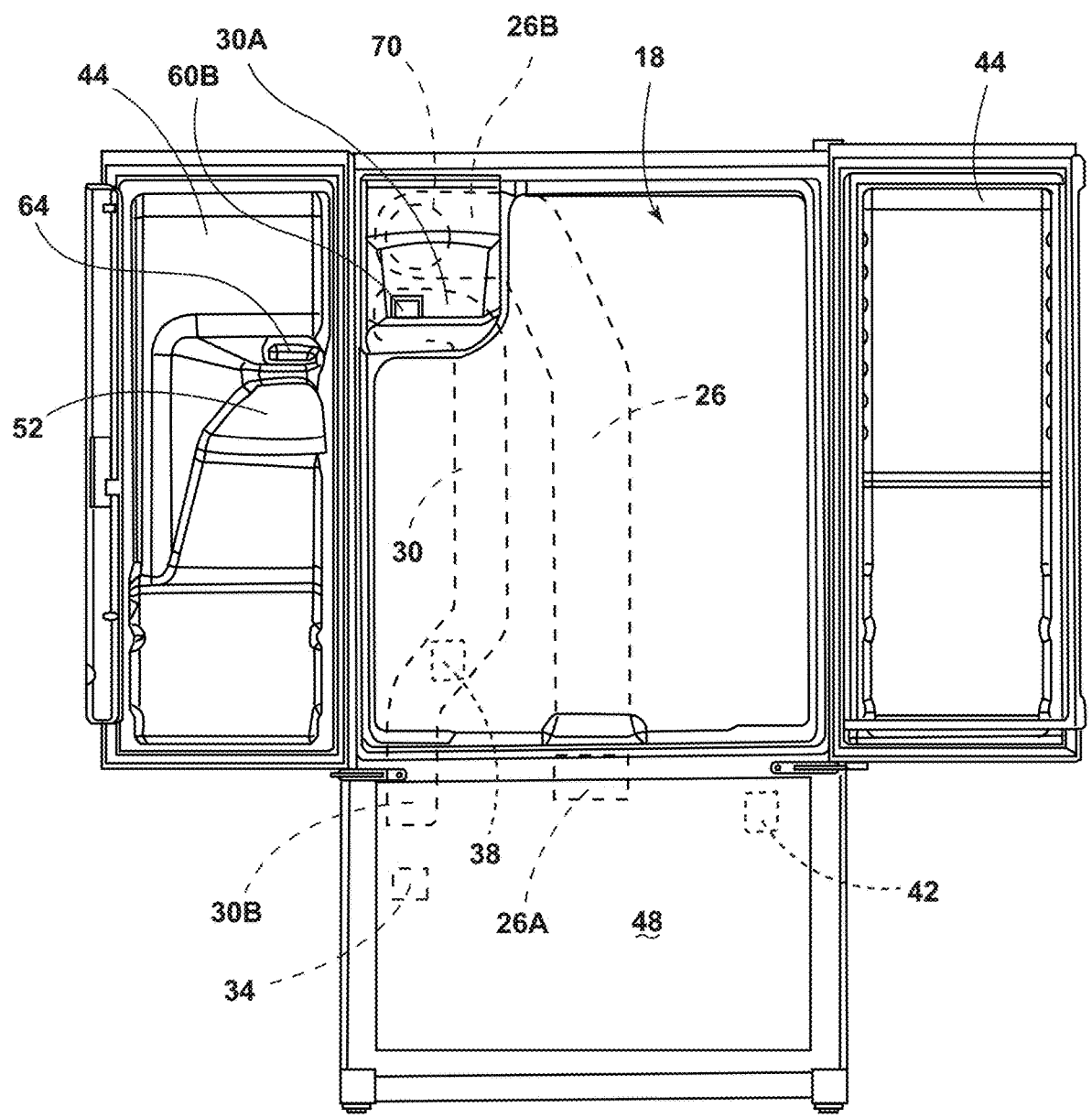
FIG. 3 is a front elevation view of the refrigeration appliance having its refrigeration compartment doors open, according to one example.

Referring now to FIGS. 1-3, the refrigeration appliance 10 is depicted as a French-door bottom-mount refrigerator, but it will be understood that the refrigeration appliance 10 may be a side-by-side refrigerator, a bottom mount refrigerator, or a top mount refrigerator. The refrigeration appliance 10 includes the refrigeration compartment 18 and the freezer compartment 14. The refrigeration compartment 18 may be a fresh food compartment configured to store food stuffs or perishables at temperatures above freezing (e.g., maintained at about 3° C. or about 4° C.) for a long time period. The freezer compartment 14 may be maintained at a subzero temperature (e.g., temperatures at or below about 0° C.) for long term storage of perishables in a frozen state. In general, the refrigeration compartment 18 may have an internal volume greater than the freezer compartment 14. The refrigeration appliance 10 includes an evaporator 42, which cools the refrigeration compartment 18 and the freezer compartment 14. One or more refrigeration doors 44 are provided for the refrigeration compartment 18 and a freezer door 48 is provided for the freezer compartment 14. One of the refrigeration doors 44 may include an ice dispenser 52, which may also include a water dispenser.

The ice maker compartment 22 is provided in the refrigeration compartment 18. In the depicted example, the ice maker compartment 22 is positioned in an upper corner of the refrigeration compartment 18, but it will be understood that the ice maker compartment 22 may be positioned in other locations within the refrigeration compartment 18 without departing from the teachings provided herein. For example, the ice maker compartment 22 may be positioned within the refrigeration doors 44 or the freezer door 48. The ice maker compartment 22 may include an ice maker covering 60. The ice maker covering 60 may include a front cover 60A that is insulated to prevent the cold air of the ice maker compartment 22 from passing into the refrigeration compartment 18. The ice maker covering 60 defines an opening 60B which mates with a chute 64 of the ice dispenser 52. A seal may be provided between the opening 60B and the chute 64 to prevent cold air from passing from the ice maker compartment 22 to the refrigeration compartment 18. An ice making apparatus may be positioned within the ice maker covering 60. The ice maker compartment 22 may be configured to use cool air provided by the ice maker supply duct 26 to freeze water and dispense the ice through the chute 64. The ice maker compartment 22 is maintained at a temperature of 0° C. or less in order to form ice, but may not be as cold as the freezer compartment 14. The ice maker covering 60 may be integrally formed adjacent the refrigeration compartment 18 during a liner forming process. Alternatively, the ice maker covering 60 may be a separate component from the liner of the refrigeration compartment 18 and attached (e.g., by overhead rails, fasteners, etc.) to the liner.

Figure 4:
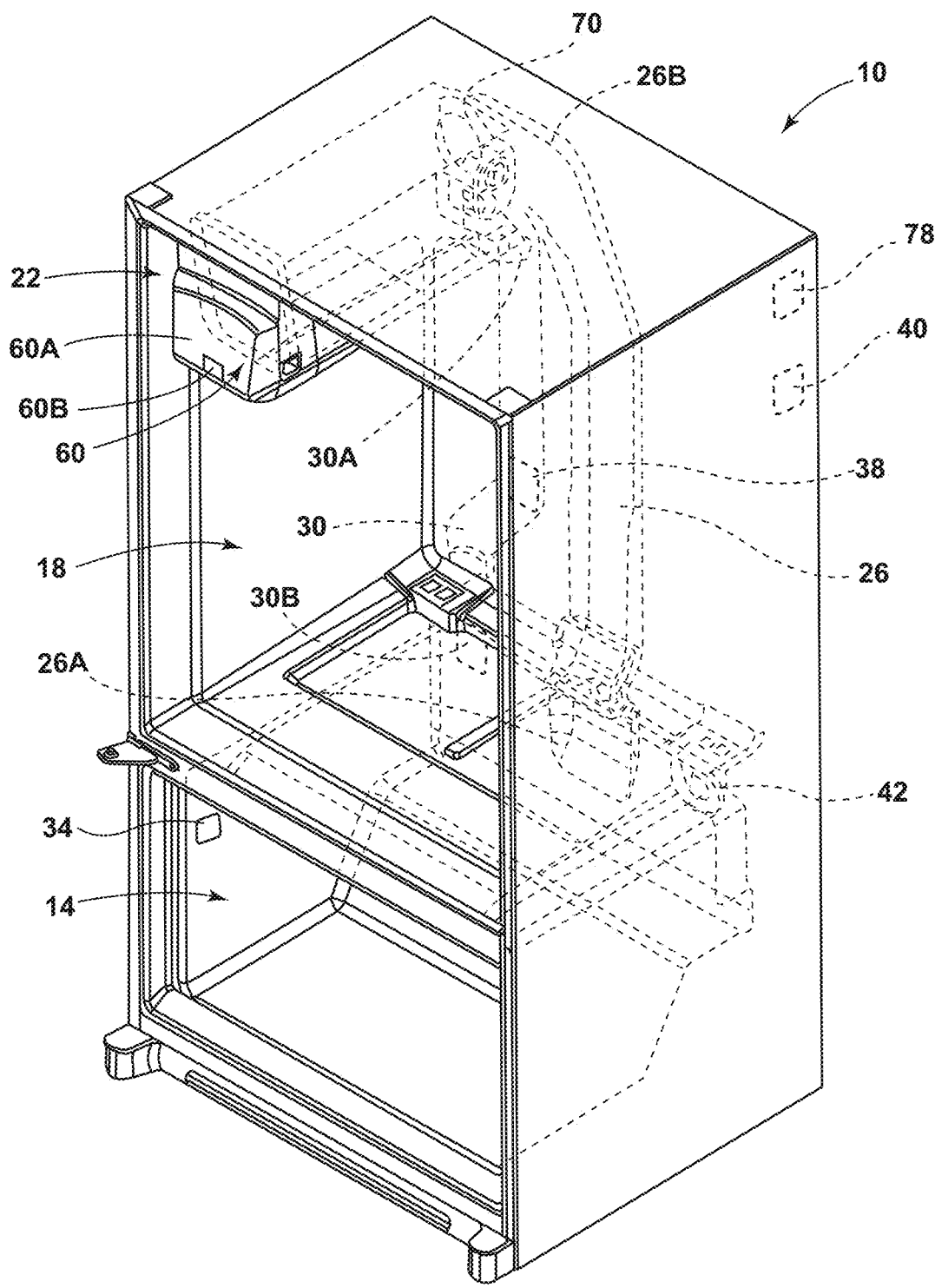
FIG. 4 is a perspective view of the refrigeration appliance having its doors in an open position, according to one example.

Referring now to FIGS. 3 and 4, the ice maker supply duct 26 extends between the freezer compartment 14 and the ice maker compartment 22. The ice maker supply duct 26 fluidly couples the freezer compartment 14 and the ice maker compartment 22. In other words, the ice maker supply duct 26 allows chilled air to pass from the freezer compartment 14 to the ice maker compartment 22. The ice maker supply duct 26 has a lower air inlet 26A within the freezer compartment 14 and an upper outlet 26B connected to an ice maker fan 70 mounted on the back wall of the ice maker compartment 22. The ice maker fan 70 draws cold air from the freezer compartment 14 and forces the cold air into the ice maker compartment 22 to facilitate ice making. It will be understood that additionally or alternatively, the ice maker fan 70 may be positioned at the inlet 26A, or anywhere along, the ice maker supply duct 26. The ice maker fan 70 controls the air flow from the freezer compartment 14 to the ice maker compartment 22 and may be a variable speed fan. The ice maker supply duct 26 may be positioned within a rear wall of the refrigeration appliance 10, but may additionally or alternatively be positioned within side walls of the refrigeration appliance 10.

Similarly to the ice maker supply duct 26, the ice maker return duct 30 may be positioned within a rear wall of the refrigeration appliance 10. The ice maker return duct 30 may additionally or alternatively be positioned within side walls of the refrigeration appliance 10. The ice maker return duct 30 fluidly couples the freezer compartment 14 and the ice maker compartment 22. In other words, the ice maker return duct 30 allows chilled air to pass from the ice maker compartment 22 to the freezer compartment 14. The ice maker return duct 30 includes an upper end 30A connected to the ice maker compartment 22 and a lower end 30B terminating within the freezer compartment 14.

The fan 38 is positioned within the ice maker return duct 30. The fan 38 may be positioned within the upper end 30A, the lower end 30B, or anywhere along the ice maker return duct 30. Further, the fan 38 may be a fan assembly including a plurality of fans, positioned proximate one another, or spread across the ice maker return duct 30. The fan 38 may be configured to blow air from the ice maker compartment 22 into the freezer compartment 14. Further, due to a negative pressure generated by the activation of the fan 38, air from within the refrigeration compartment 18 may be sucked into the ice maker compartment 22 and/or return duct 30 such that air from the refrigeration compartment 18 is blown into the freezer compartment 14. The fan 38 may be pulse width modulated in order to adjust a fan speed of the fan 38. For example, the magnitude of the fan speed may be controlled by the controller 40 to increase or decrease the volume of air blown by the fan 38 into the freezer compartment 14.

The sensor 34 may be positioned within the freezer compartment 14. In the depicted example, the sensor 34 is positioned on a side wall of the freezer compartment 14, but may additionally or alternatively be positioned on a back wall, a top wall, or a bottom wall of the freezer compartment 14. Further, a plurality of sensors 34 may be positioned throughout, or in a single location, of the freezer compartment 14. The sensor 34 may be a pressure sensor, humidity sensor, an airflow (e.g., mass flow) sensor or combinations thereof. Further, in examples where a plurality of sensors 34 are utilized, each sensor 34 may be different (e.g., one pressure sensor 34, one humidity sensor 34, one air flow sensor 34).

In pressure sensor examples of the sensor 34, the sensor 34 may be an absolute pressure sensor, a gauge pressure sensor, a vacuum pressure sensor, a differential pressure sensor, a sealed pressure sensor, or combinations thereof. The pressure sensor examples of the sensor 34 may be analog or digital. In humidity sensor examples of the sensor 34, the sensor may be an absolute humidity sensor, a mixing ratio sensor, a mass ratio sensor, a relative humidity sensor, a specific humidity sensor, a frost point sensor, a volume ratio sensor, a parts-per-million by volume sensor, a parts-per-million by weight sensor, or combinations thereof. In airflow or mass flow examples of the sensor 34, the sensor 34 may include a moving vane meter, a hot-wire sensor, a cold-wire sensor, a vortex sensor, a membrane sensor, or combinations thereof.

The sensor 34 is electrically coupled with the controller 40 and configured to communicate data to the controller 40 based on the sensed condition (e.g., pressure, humidity, air flow) of the freezer compartment 14. The sensor 34 may be configured to work in conjunction with an external sensor 78 which is configured to detect a property of the external environment (e.g., atmosphere) around the refrigeration appliance 10. The external sensor 78 may be configured to detect the same property as the sensor 34, or a different property. Further, if the sensor(s) 34 is configured to detect multiple properties of the freezer compartment 14, the external sensor 78 may detect the same, or a different set of properties about the external environment of the refrigeration appliance 10. The external sensor 78 may be electrically coupled to the sensor 34 and/or the controller 40 so that differences between the external environment and freezer compartment 14 may be determined with respect to one or more of the sensed properties. For example, pressure, humidity, and/or air flow differentials may be calculated by the controller 40 and/or sensor 34 and external sensor 78.

In another example, the refrigeration appliance 10 may not include the external sensor 78, but rather utilize a predetermined value. For example, pressure, humidity and/or airflow differentials may be calculated using the data provided by the sensor 34 and the predetermined value. The value may be based on manufacturer settings, user input settings, or calculated values. For example, a user or owner of the refrigeration appliance 10 may input an altitude and/or location (e.g., from which pressure and/or humidity may be looked up, preprogrammed, and/or determined) and the controller 40 may assign the predetermined value based on the input data from the user. Through comparison of the data from the sensor 34 and the predetermined value, a differential in the pressure, humidity, and/or airflow may be determined.

The controller 40 may be configured to activate and/or deactivate the fan 38 based on the sensed properties of the freezer compartment 14 and/or the external environment. For example, if a pressure within the freezer compartment 14 is lower than the external environment (i.e., a pressure differential exists), the controller 40 may activate the fan 38 to blow air into the freezer compartment 14. Specifically, if a negative pressure differential (i.e., the pressure within the freezer compartment 14 is lower relative to the external environment) exists, the fan 38 may be activated to blow air into the freezer compartment 14. The fan speed of the fan 38, as controlled by the controller 40, may be based on the magnitude of the negative pressure differential sensed. For example, the greater the pressure differential (i.e., the greater the negative pressured sensed in the freezer compartment 14), the greater the fan speed.

Figure 5:
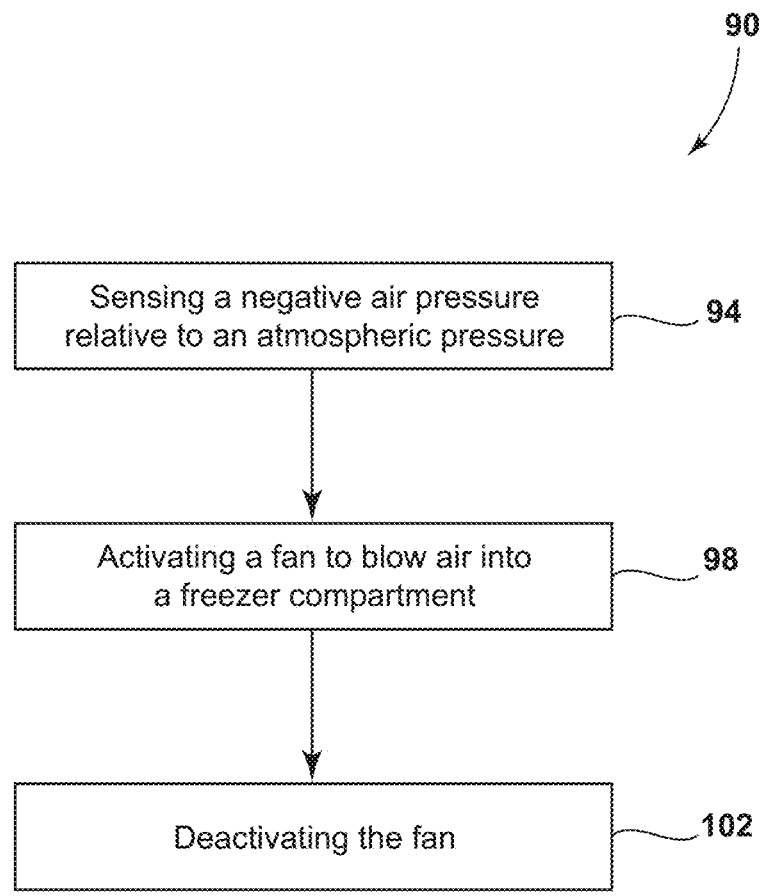
FIG. 5 is a flow chart of a method of operating the refrigeration appliance, according to one example.

Referring now to FIG. 5, depicted is an exemplary method 90 of operating the refrigeration appliance 10. The method 90 may begin with a step 94 of sensing a negative air pressure relative to an atmospheric pressure within the freezer compartment 14. As explained above, the sensor 34 may be a pressure sensor and the external sensor 78 may be a pressure sensor. The controller 40 and/or sensors 34, 78 may compare the data from the sensor 34 and the external sensor 78 to determine a negative pressure differential exists. The fan 38 may be configured to be inactive when the sensed pressure in the freezer compartment 14 is equal to or greater than the external environment pressure. Next, step 98 of activating the fan 38 to blow air into the freezer compartment 14 may be performed. The controller 40 may control the fan speed based on the sensed magnitude of the pressure differential. Further, the fan speed may be adjusted while in use based on a magnitude of the pressure differential if it changes. In other words, the fan speed may be decreased or increased as the magnitude of pressure differential decreases or increases, respectively. Next, step 102 of deactivating the fan 38 may be performed. The fan 38 may be deactivated once a sensed air pressure in the freezer compartment 14 (e.g., as sensed by the sensor 34) is equal to or greater than the atmospheric pressure (e.g., as sensed by the external sensor 78). It will be understood that the pressure differential at which the controller 40 activates and deactivates the fan 38 may have to reach a predetermined threshold prior to activation and/or deactivation. For example, a predetermined threshold may be a 0.01%, 0.1%, 1%, 2%, 5% pressure differential to activate or deactivate the fan 38.

Further, the predetermined thresholds for activation and deactivation may be different than one another. The sensed air pressure of the freezer compartment 14 may be said to be about equal with the atmospheric pressure if a pressure differential between the two is less than about 10%. It will be understood that although described in connection with a pressure differential, the method 90 may be implemented using any of the properties sensed by the sensor 34 and external sensor 78 (e.g., a humidity differential and/or an airflow differential). It will be understood that the steps of the method 90 may be performed in any order, simultaneously and/or omitted without departing from the teachings provided herein.

Figure 6:
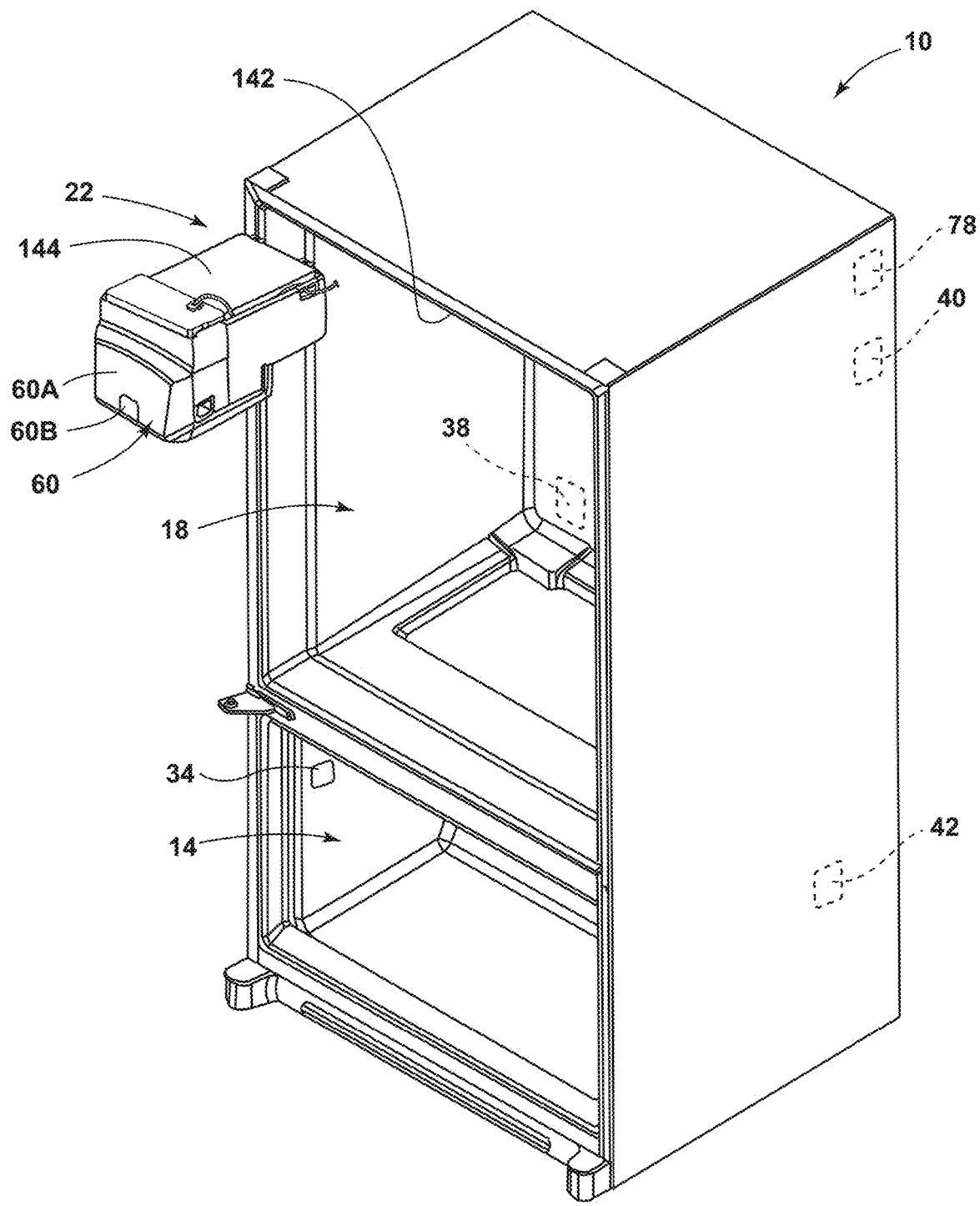
FIG. 6 is a partial exploded view of a refrigeration appliance with doors removed and an ice maker compartment removed from a refrigeration department; according to the present disclosure.
Figure 7:
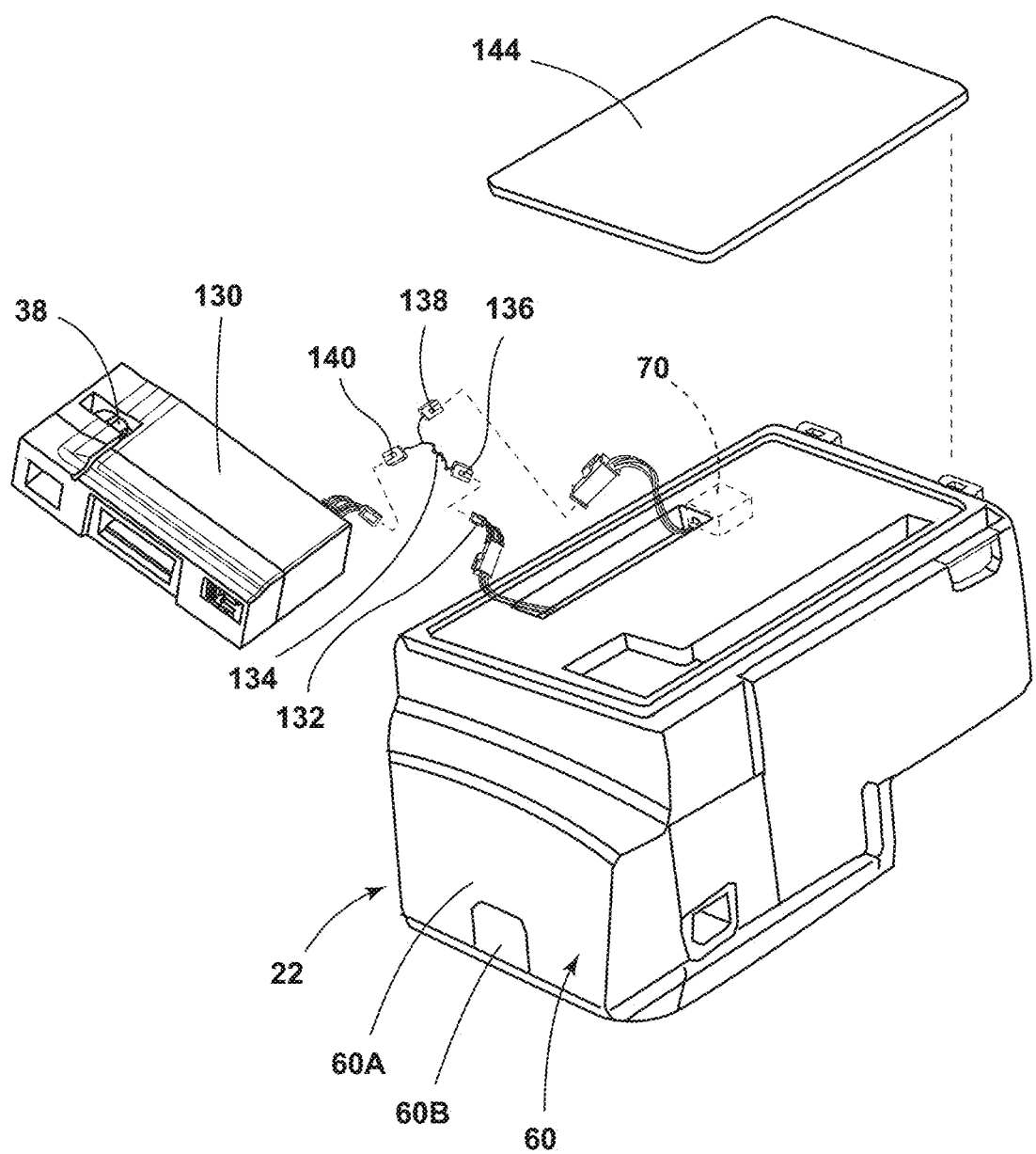
FIG. 7 is a top perspective exploded view of an ice maker compartment, according to the present disclosure.

Referring to FIGS. 6 and 7, as previously stated, the fan 38 operates as a return fan for directing air from the ice maker compartment 22 to the freezer compartment 14 based on sensed conditions of the refrigeration appliance 10. The fan 38 may be installed in the refrigeration appliance 10 during the manufacturing process. Alternatively, the fan 38 may be installed after completion of the manufacturing process. In such examples, the fan 38 may be included in an adapter 130 installed in the ice maker compartment 22. The ice maker compartment 22 generally includes a wiring harness 132 for electrically coupling the ice maker fan 70 to the controller 40. The ice maker fan 70 may be disconnected from the wiring harness 132 to allow for insertion of a splitter 134.

The splitter 134 may be coupled to each of the fan 38 and the ice maker fan 70, thereby operably coupling the controller 40 with the fan 38 and the ice maker fan 70. A first connector 136 of the splitter 134 engages the wiring harness 132, a second connector 138 engages the ice maker fan 70, and a third connector 140 engages the fan 38. Accordingly, the fan 38 and the ice maker fan 70 may be in communication with one another and the controller 40. The adapter 130 including the fan 38 may be installed into the ice maker compartment 22 and may replace a previous adapter feature. It is also contemplated that in configurations of the refrigeration appliance 10 with the fan 38 installed during the manufacturing process, the splitter 134 may be installed and coupled to the fan 38 and the ice maker fan 70 without the installation of the adapter 130. To access the ice maker compartment 22, the ice maker compartment 22 may be disengaged from a ceiling 142. A top cover 144, that typically abuts the ceiling 142, may be removed to allow access to an interior of the ice maker compartment 22.

Figure 8:
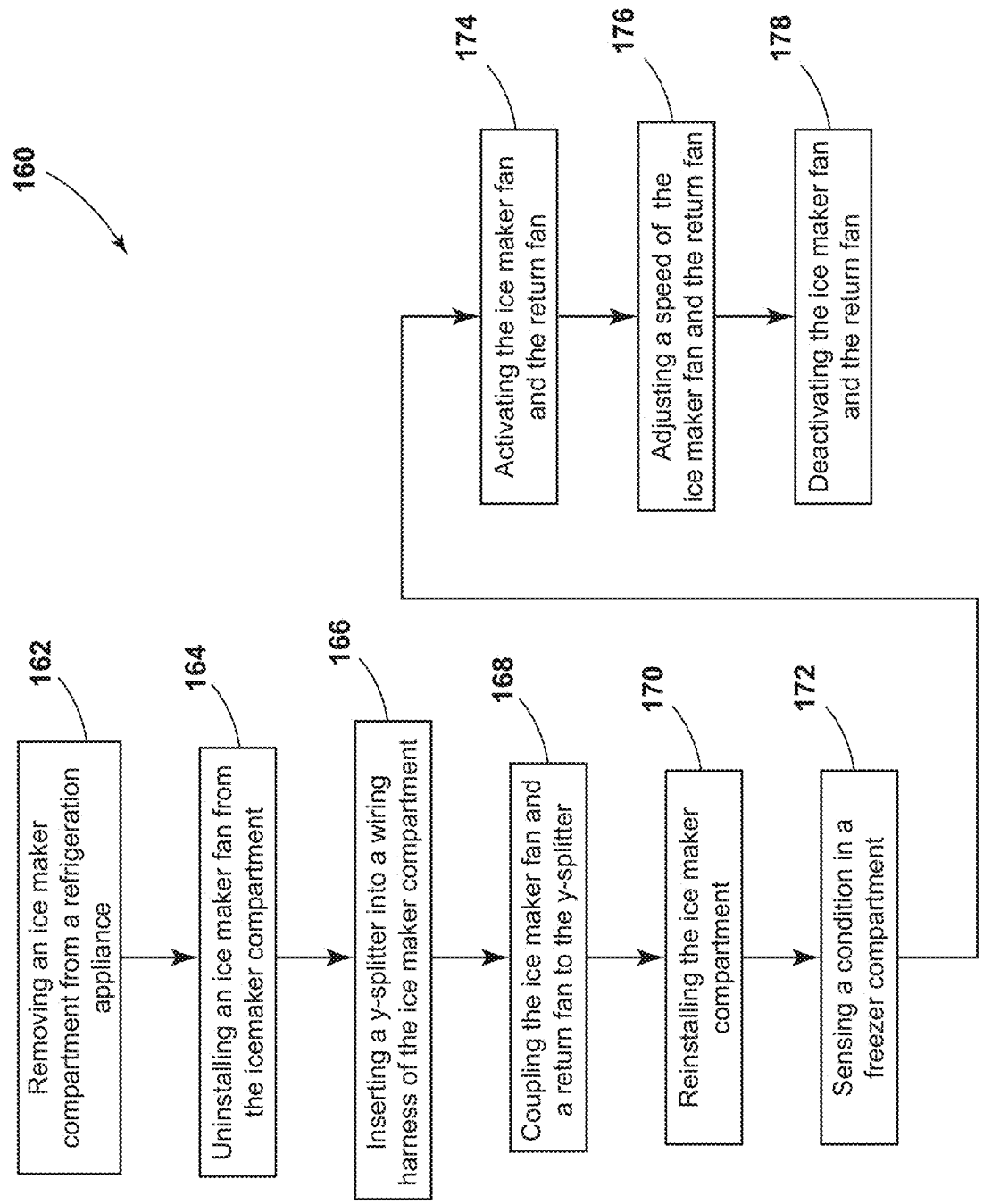
FIG. 8 is a flow diagram of a method of servicing a refrigeration appliance, according to the present disclosure.

Referring still to FIGS. 6 and 7, as well as FIG. 8, a method 160 for servicing the refrigeration appliance 10 to reduce the differential in conditions (e.g., air pressure, humidity, air flow, etc.) is disclosed. The method 160 includes step 162 of removing the ice maker compartment 22 from the refrigeration appliance 10. In step 162, electrical and water connections that extend between the ice maker compartment 22 and the remainder of the refrigeration appliance 10 are disconnected. Generally, the ice maker compartment 22 is mechanically fastened to the ceiling 142. In step 162, the ice maker compartment 22 is unfastened from the ceiling 142 and pulled forward (e.g., out of the refrigeration appliance 10) by a user or service technician. It is contemplated that other components, such as ceiling panels, fascia covers of the ice maker compartment 22, heating components, etc. may also be disconnected or uninstalled in step 162.

In step 164, the ice maker fan 70 is disconnected from the wiring harness 132 of the ice maker compartment 22. To access an electrical connector of the ice maker fan 70, the top cover 144 of the ice maker compartment 22 is removed, generally by removing mechanical fasteners. Additionally or alternatively, the ice maker compartment 22 may include a previous adapter feature without the fan 38. This previous adapter feature may be removed from the ice maker compartment 22 in step 164 by releasing clips or other coupling features.

In step 166, the splitter 134 is installed into the ice maker compartment 22. The first connector 136 engages the wiring harness 132 of the ice maker compartment 22. The first connector 136 is generally a 3-pin male connector.

In step 168, the fan 38 and the ice maker fan 70 are coupled to the splitter 134. Accordingly, the splitter 134 is generally configured as a Y-splitter. The ice maker fan 70 engages the second connector 138 of the splitter 134. The ice maker fan 70 may have a 3-pin female connector that engages the mating second connector 138 of the splitter 134. Additionally, in step 168, the adapter 130 is installed in the ice maker compartment 22. The ice maker compartment 22 may include snap features or other coupling members for coupling the adapter 130 to the ice maker compartment 22. Further, the fan 38, which may be included in the adapter 130, may be coupled to the splitter 134. The fan 38 may have a 2-pin connector that engages the third connector 140 of the splitter 134. The adapter 130 with the fan 38 may be configured to reduce condensation and frost buildup within or on the ice maker compartment 22 and the freezer compartment 14.

As previously stated, the fan 38 may be installed in the refrigeration appliance 10 during the manufacturing process. In such examples, the previously installed fan 38 may be coupled to the splitter 134 installed in step 166. Accordingly, the adapter 130 may not be installed, and the refrigeration appliance 10 may utilize an adapter feature or similar component previously installed in the ice maker compartment 22.

In step 170, the ice maker compartment 22 is reinstalled in the refrigeration appliance 10. To do so, the ice maker compartment 22 is moved to abut the ceiling 142 and then is generally mechanically fastened to the ceiling 142. The electrical and water connections disconnected in step 162 are reconnected. Additionally, any other components (e.g., ceiling panels, fascia covers of the ice maker compartment 22, heating components, etc.) removed or disconnected in step 162, may also be reconnected or reinstalled in step 170.

In step 172, the controller 40 determines if there is a differential in conditions between the freezer compartment 14 and an area external to the refrigeration appliance 10, as sensed by the sensor 34 and external sensor 78. Step 172 includes sensing the selected condition within the freezer compartment 14 (e.g., an internal condition) and the selected condition in the area external to the refrigeration appliance 10 (e.g., an external condition). If the differential in condition exists, in step 174, the controller 40 may activate the fan 38 and the ice maker fan 70. A pulse signal sent by the controller 40 to the ice maker fan 70 may also be communicated to the fan 38 based on the connection through the splitter 134. Accordingly, the fan 38 and ice maker fan 70 may operate concurrently to minimize the differential in the sensed condition.

The sensed condition may be air pressure, humidity, or air flow, as previously described herein. In air pressure differential examples, the fan 38 and ice maker fan 70 may be activated when the sensed pressure in the freezer compartment 14 (e.g., an internal air pressure) is lower than the sensed air pressure in the area external to the refrigeration appliance 10 (e.g., a negative pressure differential exists between the internal air pressure and an external air pressure). The sensed air pressure in the freezer compartment 14 may also be compared to a predetermined air pressure threshold, and the fan 38 and the ice maker fan 70 may be activated when the sensed air pressure in the freezer compartment is below the predetermined air pressure threshold.

In humidity sensor examples, the fan 38 and ice maker fan 70 may be activated when the sensed humidity within the freezer compartment 14 (e.g., an internal humidity) is greater than the sensed humidity in the area external to the refrigeration appliance 10 (e.g., an external humidity). Increased humidity relative to the external area may indicate that the freezer compartment 14 is drawing air from outside the refrigeration appliance 10 to relieve a negative pressure differential. The sensed humidity in the freezer compartment 14 may also be compared to a predetermined humidity threshold, and the fan 38 and the ice maker fan 70 may be activated when the sensed humidity in the freezer compartment is above the predetermined humidity threshold.

In air flow sensor examples, the fan 38 and ice maker fan 70 may be activated when the air flow within the freezer compartment 14 (e.g., an internal air flow) is above an air flow sensed external to the refrigeration appliance 10 (e.g., an external air flow). The increased air flow within the freezer compartment 14 may indicate the freezer compartment 14 is drawing air into the freezer compartment 14 to minimize the negative pressure differential. The sensed air flow in the freezer compartment 14 may also be compared to a predetermined air flow threshold, and the fan 38 and the ice maker fan 70 may be activated when the sensed air flow in the freezer compartment 14 is above the predetermined air flow threshold. It is contemplated that the refrigeration appliance 10 may not include the sensor 34 and/or the external sensor 78. In such examples, the fan 38 and the ice maker fan 70 may be operated concurrently based on a protocol or routine stored within the controller 40. The protocol or routine may relate to supplying air to the ice maker compartment 22 for an ice making process.

Referring still to FIGS. 6-8, in step 176, a speed of the fans 38, 70 may be adjusted in response to a magnitude of the differential of the condition. For example, the greater the differential in the condition (e.g., air pressure, humidity, air flow, etc.) between the freezer compartment 14 and the area external to the refrigeration appliance 10 or the predetermined threshold, the faster the fans 38, 70 is operated. As the differential is reduced, as sensed by one or both of the sensor 34 and the external sensor 78, the controller 40 may reduce the fan speed accordingly.

In step 178, the ice maker fan 70 and the fan 38 are deactivated when the sensed condition within the freezer compartment 14 is about equal to the predetermined threshold or the condition sensed external to the refrigeration appliance 10. In air pressure examples, the ice maker fan 70 and the fan 38 may be deactivated when the air pressure within the freezer compartment 14 is equal to or greater than the predetermined threshold or the sensed condition external to the refrigeration appliance 10. In humidity examples, the ice maker fan 70 and the fan 38 may be deactivated when the humidity within the freezer compartment 14 is equal to or less than the predetermined threshold or the sensed condition external to the refrigeration appliance 10. In air flow examples, the ice maker fan 70 and the fan 38 may be deactivated when the air flow within the freezer compartment 14 is equal to or less than the predetermined threshold or the sensed condition external to the refrigeration appliance 10. It is understood that the steps of the method 160 may be performed in any order, simultaneously, or omitted without departing from the teachings provided herein.

Figure 9:
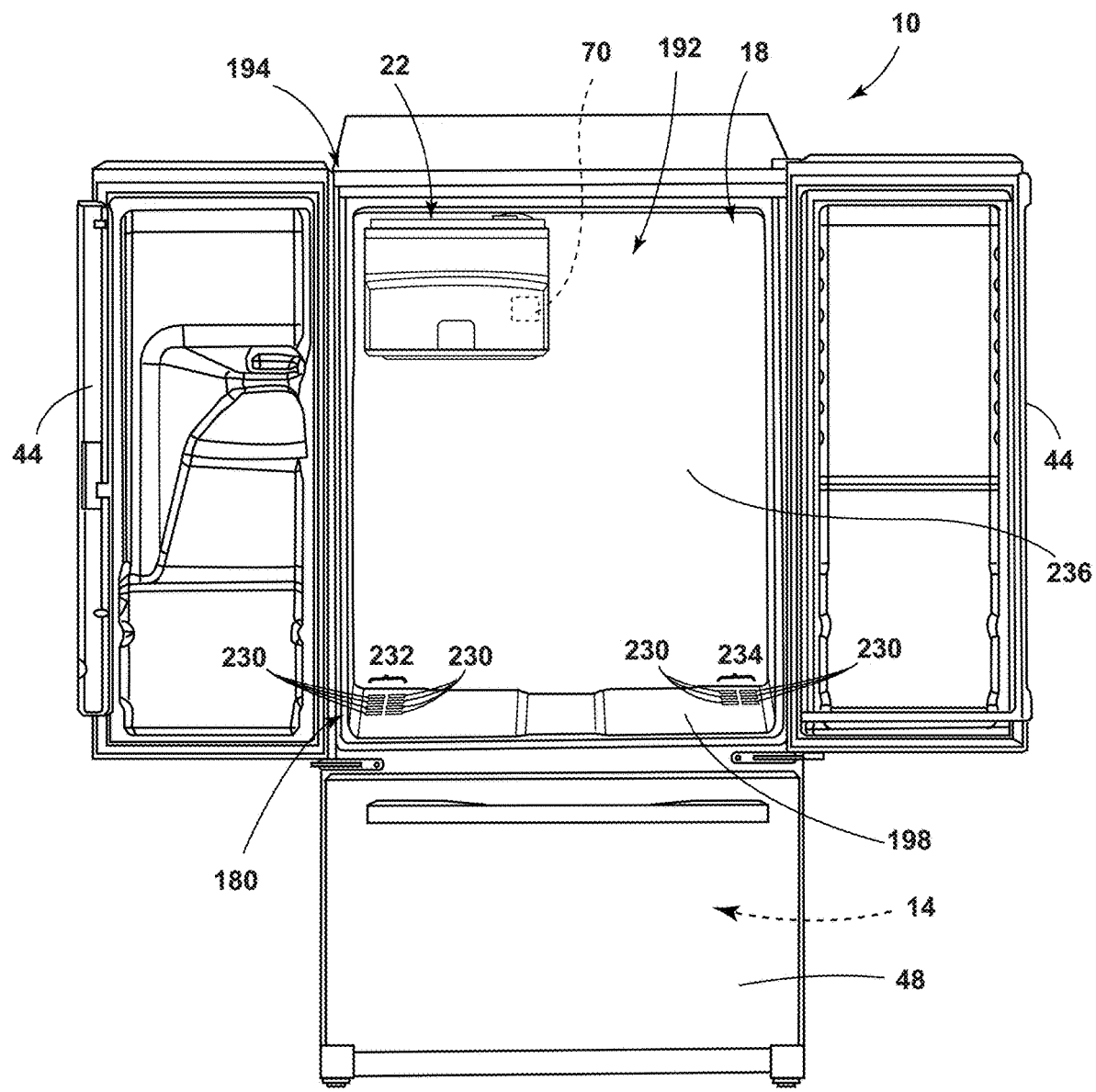
FIG. 9 is a front perspective view of a refrigeration appliance having an air flow assembly, according to the present disclosure.
Figure 10:
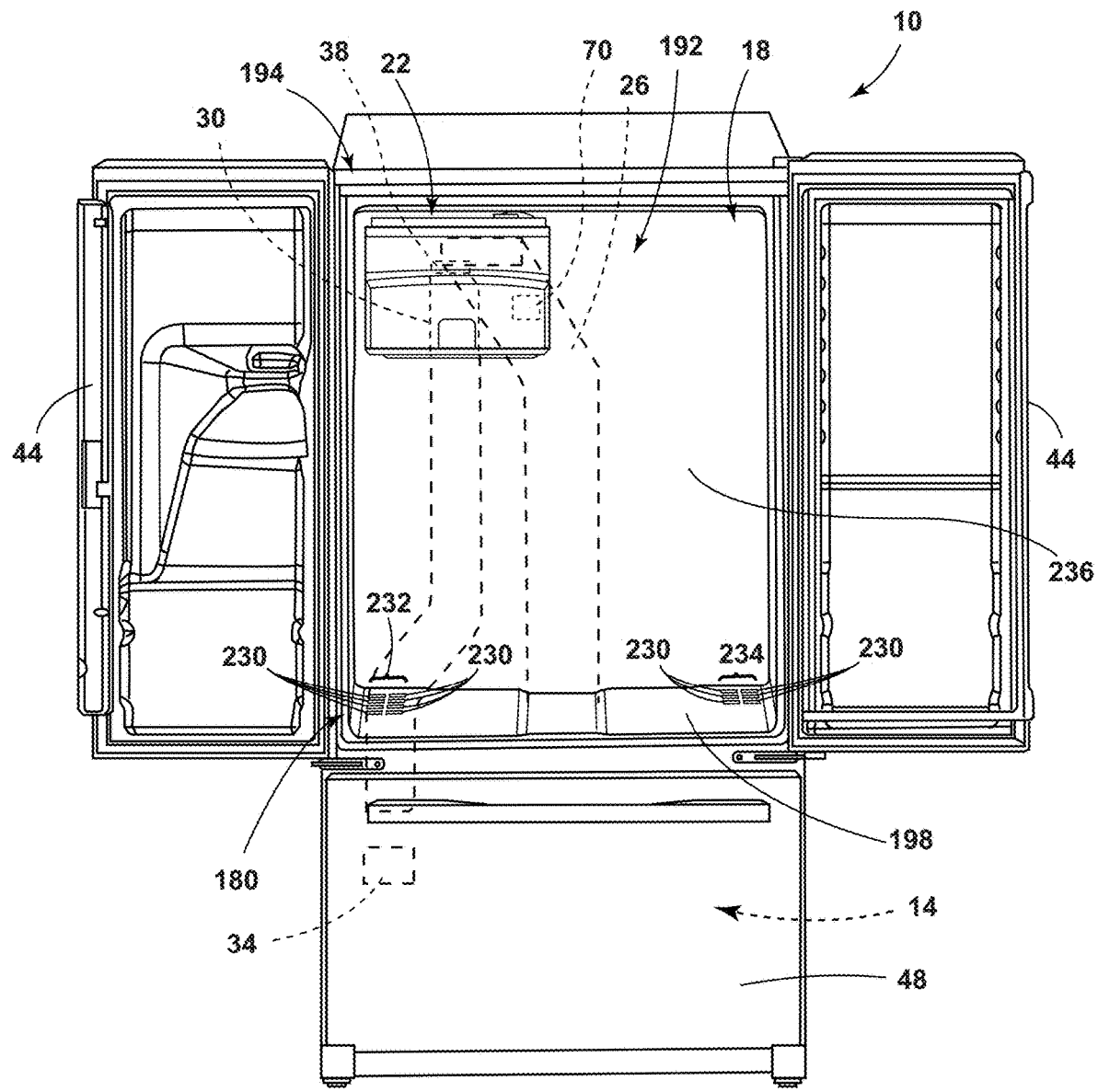
FIG. 10 is a front perspective view of a refrigeration appliance having an air flow assembly, according to the present disclosure.

Referring to FIGS. 9 and 10, an additional or alternative configuration of the refrigeration appliance 10 is illustrated. The refrigeration appliance 10 includes the ice maker compartment 22 in the refrigeration compartment 18. The ice maker supply duct 26 extends between the freezer compartment 14 and the ice maker compartment 22 for directing air to the ice maker compartment 22. The refrigeration appliance 10 may include the ice maker return duct 30 for directing air from the ice maker compartment 22 to the freezer compartment 14. If the refrigeration appliance 10 includes the ice maker return duct 30, the fan 38 may be included. However, it is contemplated that refrigeration appliance 10 may not include one or both of the fan 38 and the ice maker return duct 30.

Figure 11:
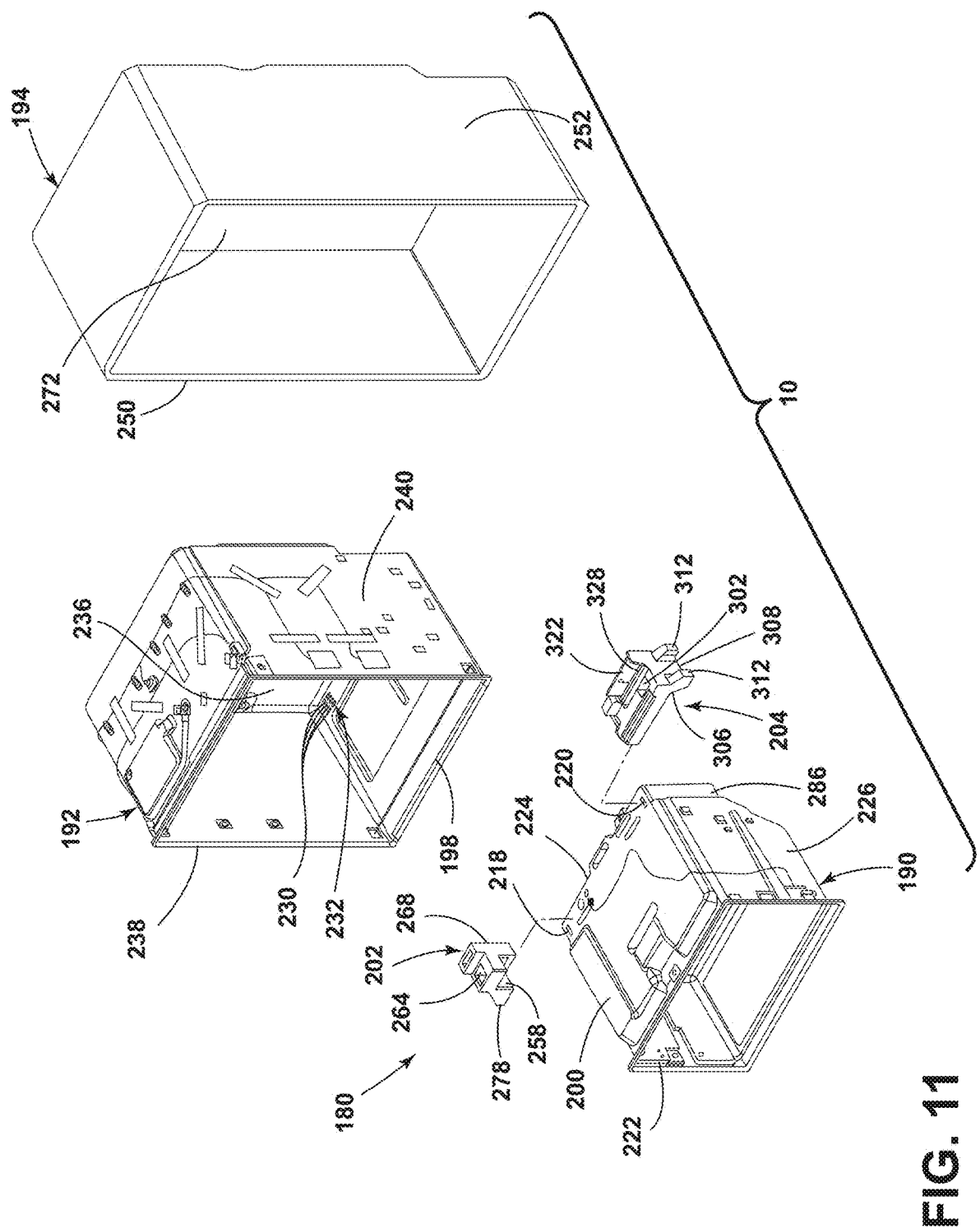
FIG. 11 is an exploded view of an outer wrapper with a refrigeration liner and a freezer liner and an air flow assembly, according to the present disclosure.

Referring still to FIGS. 9 and 10, as well as FIG. 11, the refrigeration compartment 18 may be in fluid communication with the freezer compartment 14 through an air flow assembly 180, which is generally separate from a primary air flow system (e.g., the ice maker supply duct 26, the ice maker return duct 30, etc.). The refrigeration appliance 10 is illustrated as a bottom-mount refrigerator including a freezer liner 190 that defines the freezer compartment 14 and a refrigeration liner 192 that defines the refrigeration compartment 18. The freezer liner 190 and the refrigeration liner 192 are disposed within an outer wrapper 194. A space 196 is defined between a bottom panel 198 of the refrigeration liner 192 and a top panel 200 of the freezer liner 190.

The air flow assembly 180 is at least partially disposed within the space 196 between the freezer liner 190 and the refrigeration liner 192. The air flow assembly 180 includes a first air duct 202 horizontally aligned with and spaced from a second air duct 204. The first and second air ducts 202, 204 fluidly couple the refrigeration compartment 18 and the freezer compartment 14 and allow air exchange between the freezer and refrigeration compartments 14, 18.

Figure 12:
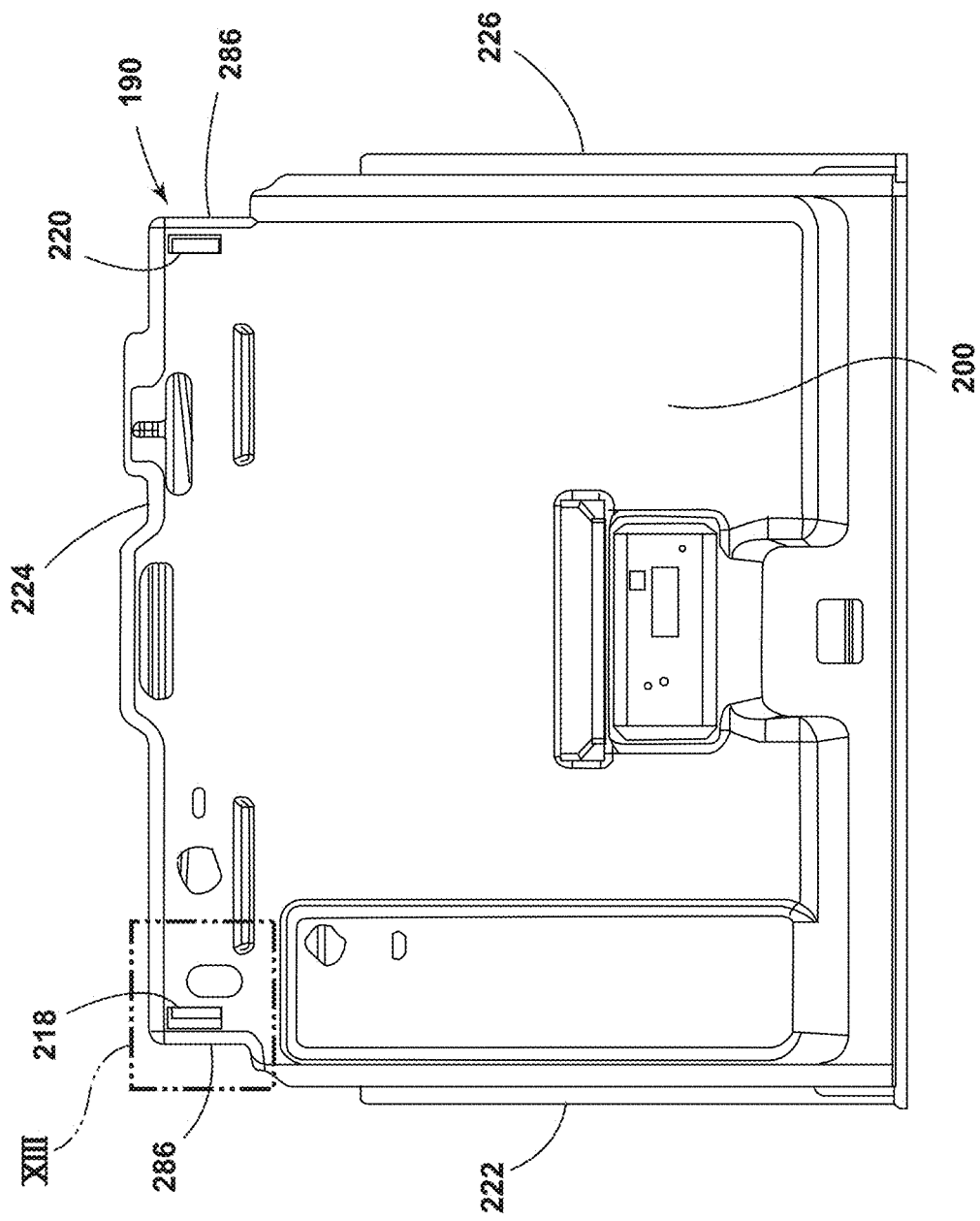
FIG. 12 is a top elevational view of a freezer liner, according to the present disclosure.

Referring still to FIG. 11, as well as FIG. 12, the top panel 200 of the freezer liner 190 defines apertures 218, 220. In the illustrated configuration, the first aperture 218 is defined proximate a first sidewall 222 and a rear wall 224 of the freezer liner 190. The second aperture 220 is defined proximate the rear wall 224 and a second sidewall 226. Accordingly, the apertures 218, 220 are defined proximate upper, rear corners of the freezer liner 190. It is contemplated that the first aperture 218 is substantially identical to the second aperture 220, however, depending on the configuration of the refrigeration appliance 10, the apertures 218, 220 may differ.

Figure 13:
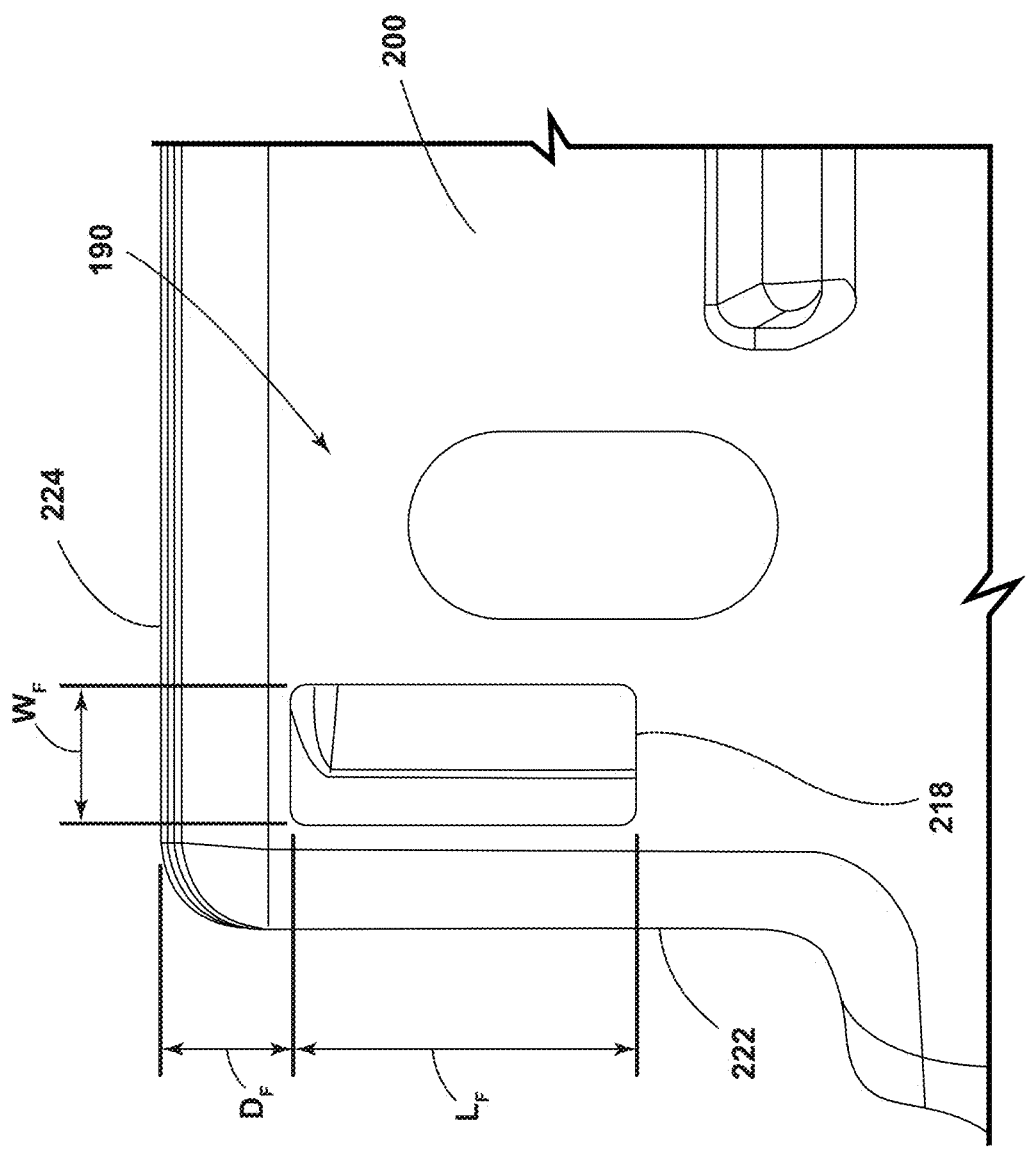
FIG. 13 is an enlarged view of an aperture defined by the freezer liner of FIG. 12, taken at area XIII.

As best illustrated in FIG. 13, the aperture 220 is substantially rectangular with a depth or length, $L_{f}$, in a range from about 40 mm to about 50 mm and a width, $W_{f}$, in a range from about 15 mm to about 25 mm. In a specific configuration, the aperture 220 has a depth or length, $L_{f}$, of about 47 mm and a width, $W_{f}$, of about 19 mm. The aperture 220 is spaced from an edge of the top panel 200 adjacent to the rear wall 224 by a distance, $D_{f}$, in a range from about 10 mm to about 15 mm. It is contemplated that the aperture 218 has a similar configuration and is spaced a similar distance from an edge of the rear wall 224 adjacent to the first sidewall 222.

Figure 14:
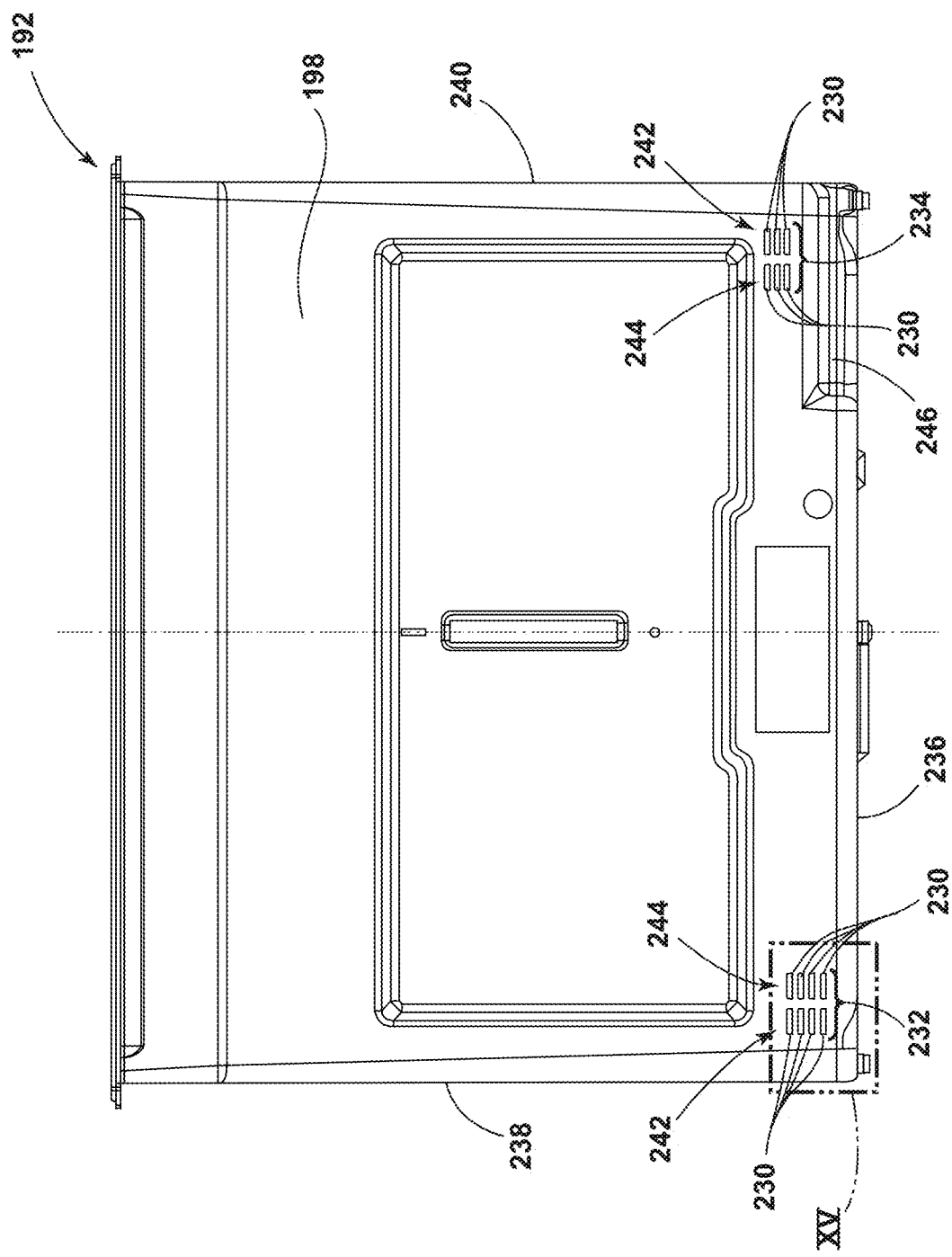
FIG. 14 is a top elevational view of a refrigeration liner, according to the present disclosure.

Referring still to FIG. 11, as well as FIG. 14, the bottom panel 198 of the refrigeration liner 192 defines slots 230. The slots 230 are generally arranged in a first set 232 and a second set 234. The first set 232 of slots 230 is generally disposed proximate a rear wall 236 and a first sidewall 238 of the refrigeration liner 192. The second set 234 of slots 230 is generally defined proximate the rear wall 236 and second sidewall 240. Accordingly, the slots 230 are defined in lower, rear corners of the refrigeration liner 192. The first set 232 of slots 230 may generally be vertically aligned with the aperture 218 defined in the freezer liner 190, and the second set 234 of slots 230 may generally be vertically aligned with the aperture 220 of the freezer liner 190 when the freezer and refrigeration liners 190, 192 are disposed in the outer wrapper 194.

Figure 15:
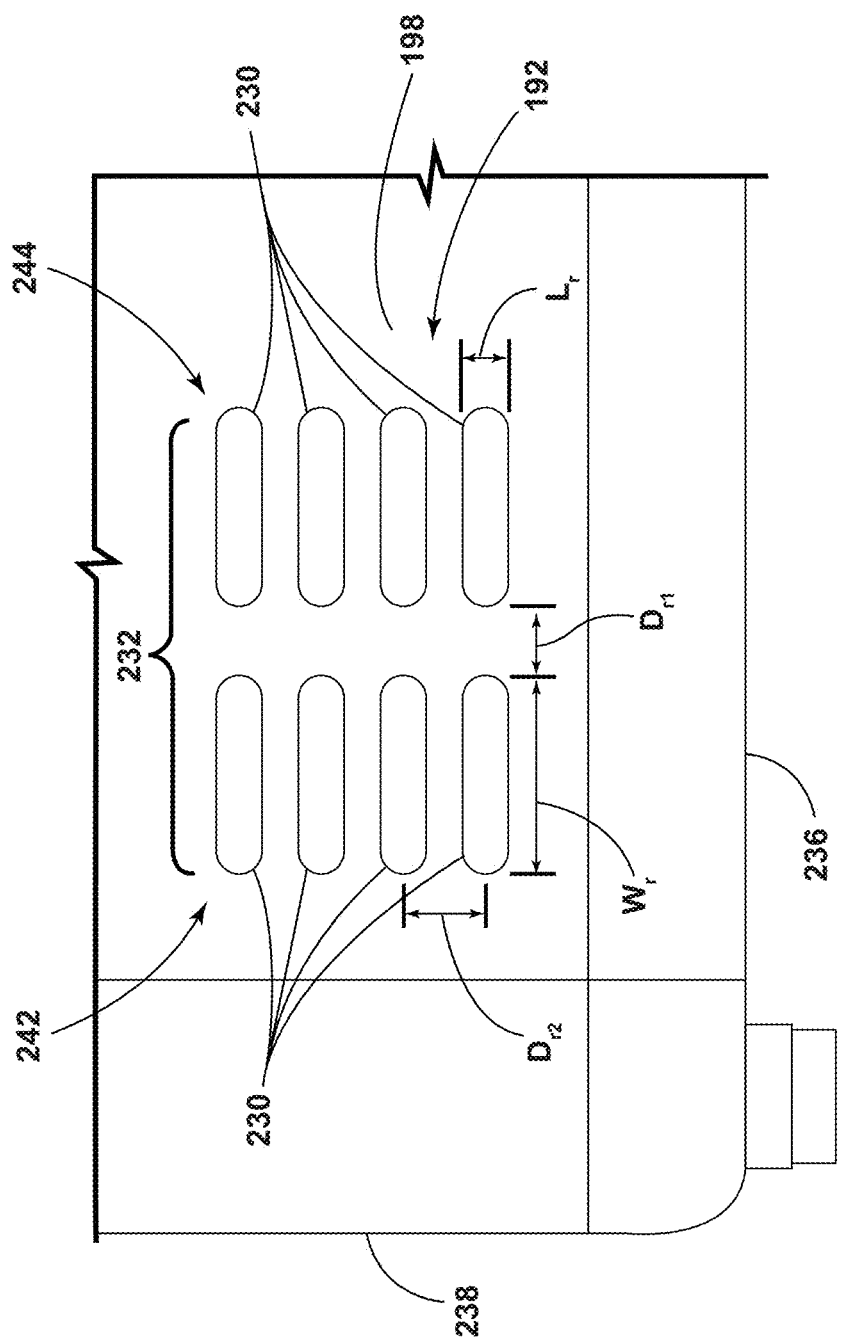
FIG. 15 is an enlarged view of slots defined by the refrigeration liner of FIG. 14, taken at area XV.

As best illustrated in FIGS. 14 and 15, each slot 230 may be substantially identical. Each slot 230 may have a width, $W_r$, in a range from about 20 mm to about 30 mm and a length or depth, $L_r$, in a range from about 2 mm to about 10 mm. In a specific configuration, each slot 230 has a width, $W_r$, of about 25 mm and a length or depth, $L_r$, of about 5.5 mm. The slots 230 in each of the first and second sets 232, 234 are arranged in two columns 242, 244. The slots 230 in the first column 242 are spaced from the column 244. The space between each slot 230 in the first column 242 and the adjacent slot 230 in the second column 244 is substantially equal. The first column 242 is spaced a distance, $D_{r1}$, in a range from about 5 mm to about 10 mm from the second column 244. In a specific configuration, the space, $D_{r1}$, is about 8 mm wide between the first and second columns 242, 244. Further, the slots 230 in each column 242, 244 are spaced apart from one another. A central point of one slot 230 is spaced from a central point in an adjacent slot 230 within the same column by a distance, $D_{r2}$, in a range from about 5 mm to about 15 mm. In a specific configuration, central or mid-points of each slot 230 may be spaced a distance, $D_{r2}$, of about 10 mm from the central or mi-point of an adjacent slot 230 within the same column.

The bottom panel 198 of the refrigeration liner 192 may define an indent 246 proximate the second sidewall 240. The indent 246 may affect the positioning and number of slots 230 within the second set 234. In the illustrated configuration, the first set 232 includes eight slots 230, and the second set 234 includes six slots 230. It is contemplated that any practicable number of slots 230 may be included in each of the first and second sets 232, 234 without departing from the teachings herein. The first set 232 is horizontally offset from the second set 234 due to the indent 246 on one side of the refrigeration liner 192.

Referring to FIGS. 14 and 15, the first and second air ducts 202, 204 are positioned proximate opposing sidewalls 250, 252 of the outer wrapper 194. The first air duct 202 aligns with the aperture 218 proximate the first sidewall 222. The first air duct 202 extends partially across the top panel 200, partially along the first sidewall 222, and partially along the rear wall 224 of the freezer liner 190. Accordingly, the first air duct 202 defines a receiving space 258 for receiving an upper, rear corner of the freezer liner 190 (as best illustrated in FIG. 11). The first air duct 202 defines a bottom opening 260 on a first surface 262 that extends over the top panel 200 and partially defines the receiving space 258. The bottom opening 260 is vertically aligned and in fluid communication with the aperture 218.

The first air duct 202 also defines a top opening 264 on a second surface 266 that vertically aligns with the first set 232 of slots 230. The second surface 266 abuts the bottom panel 198 of the refrigeration liner 192. The first surface 262 (e.g., a bottom surface) is an opposing surface relative to the second surface 266 (e.g., a top surface). The top opening 264 extends around the first set 232 of slots 230 collectively.

The first air duct 202 includes a rear extension 268 that extends beyond each of the first surface 262 and the second surface 266. A rear surface 270 of the rear extension 268 abuts a rear wall 272 of the outer wrapper 194. A side surface 274 of the rear extension 268 abuts the first sidewall 250 of the outer wrapper 194, and a front surface 276 at least partially abuts the rear wall 224 of the freezer liner 190 and at least partially defines the receiving space 258. The front surface 276 also extends adjacent to the second surface 266 of the first air duct 202 that defined the top opening 264.

Referring still to FIGS. 14 and 15, the first air duct 202 also includes a side extension 278 that extends between the first sidewall 222 of the freezer liner 190 and the first sidewall 250 of the outer wrapper 194. The side extension 278 includes a first side surface 280 that abuts the outer wrapper 194 and a second, opposing side surface 282 that at least partially defined the receiving space 258. The first side surface 280 has a height that is less than a height of the second side surface 282. A top surface 284 is sloped, extending at an acute angle relative to the first sidewall 250 of the outer wrapper 194. As such, the side extension 278 has a substantially truncated triangular shape.

The first sidewall 222 of the freezer liner 190 includes an offset region 286 that is set back (toward an interior of the freezer liner 190) relative to the remainder of the first sidewall 222. The first air duct 202 is generally positioned within this offset region 286. The side extension 278 may be positioned proximate to an edge of the offset region 286 where the first sidewall 222 transitions from the offset region 286 to the remainder of the first sidewall 222. The first air duct 202 extends within the space 196 between the freezer and refrigeration liners 190, 192, a space between the freezer liner 190 and the first sidewall 250 of the outer wrapper 194, a space between the freezer liner 190 and the rear wall 272 of the outer wrapper 194, a space between the refrigeration liner 192 and the first sidewall 250 of the outer wrapper 194, and a space between the refrigeration liner 192 and the rear wall 272 of the outer wrapper 194. Accordingly, the first air duct 202 engages the freezer liner 190, the refrigeration liner 192, and the outer wrapper 194.

The second air duct 204 is generally positioned over the aperture 220 defined by the top panel 200 proximate the second sidewall 226 of the freezer liner 190. The second air duct 204 extends at least partially along the top panel 200, the second sidewall 226, and the rear wall 224 of the freezer liner 190. The second air duct 204 extends a greater distance across the top panel 200 of the freezer liner 190 relative to the first air duct 202.

The second air duct 204 defines a bottom opening 298 in a first surface 300 and a top opening 302 in a second surface 304. The bottom opening 298 is vertically aligned and in fluid communication with the top opening 302 and aperture 220 defined by the freezer liner 190. The second air duct 204 defines a receiving space 306 for receiving an upper, rear corner of the freezer liner 190. Accordingly, the second air duct 204 extends along the top panel 200, as well as the second sidewall 226 in the rear wall 224 of the freezer liner 190.

Additionally, the second air duct 204 defines a side extension 308 that extends between the second sidewall 226 of the freezer liner 190 and the second sidewall 252 of the outer wrapper 194. The side extension 308 extends beyond the first surface 300 and the second surface 304. A first side surface 310 abuts the second sidewall 226 of the freezer liner 190 and at least partially defines the receiving space 306. Projections 312 extend from a second, opposing side surface 314 to abut the second sidewall 252 of the outer wrapper 194. The projections 312 are spaced from one another, with one projection 312 disposed proximate a front edge of the side extension 308 and the other projection 312 disposed proximate a rear edge of the side extension 308. A first side 316 of each projection 312 has a greater height than a second side 318 that abuts the outer wrapper 194. A top surface 320 of each projection 312 slopes and the projections 312 each have a substantially truncated triangular shape. Each top surface 320 defines an acute angle with the second sidewall 252 of the outer wrapper 194.

The second air duct 204 also includes a rear extension 322 that abuts the rear wall 272 of the outer wrapper 194. The rear extension 322 extends beyond the first surface 300 and the second surface 304 of the second air duct 204. A front surface 324 at least partially defines the receiving space 306. A portion of the front surface 324 also extends adjacent to the second surface 304, which defines the top opening 302. A rear surface 326 abuts the outer wrapper 194.

The rear extension 322 generally extends into the indent 246 defined by the refrigeration liner 192. The rear extension 322 is generally sized and shaped to fill the indent 246 and abut surfaces of the refrigeration liner 192 that define the indent 246. Additionally or alternatively, the rear extension 268 may have a first depth or thickness for a portion within the indent 246 and a second depth or thickness in a portion that extends between the refrigeration liner 192 and the rear wall 272 of the outer wrapper 194, but outside the indent 246.

Additionally or alternatively, the second air duct 204 may define an additional receiving space 328 to receive a lower, rear corner of the refrigeration liner 192. The side extension 308 also extends above the second surface 314 and extends a similar distance as the rear extension 322. The side extension 308 may extend an entire depth of the second air duct 204 below the first surface 300 and a portion of the depth proximate a rear edge above the second surface 304.

Referring still to FIGS. 14 and 15, the second air duct 204 abuts the bottom panel 198 of the refrigeration liner 192. The first surface 300 (e.g., a top surface) is an opposing surface relative to the second surface 304 (e.g., a bottom surface). The bottom opening 298 extends around the aperture 220 and the top opening 302 extends around the second set 234 of slots 230 collectively to define an air flow path between the freezer compartment 14 and the refrigeration compartment 18.

Figure 16:
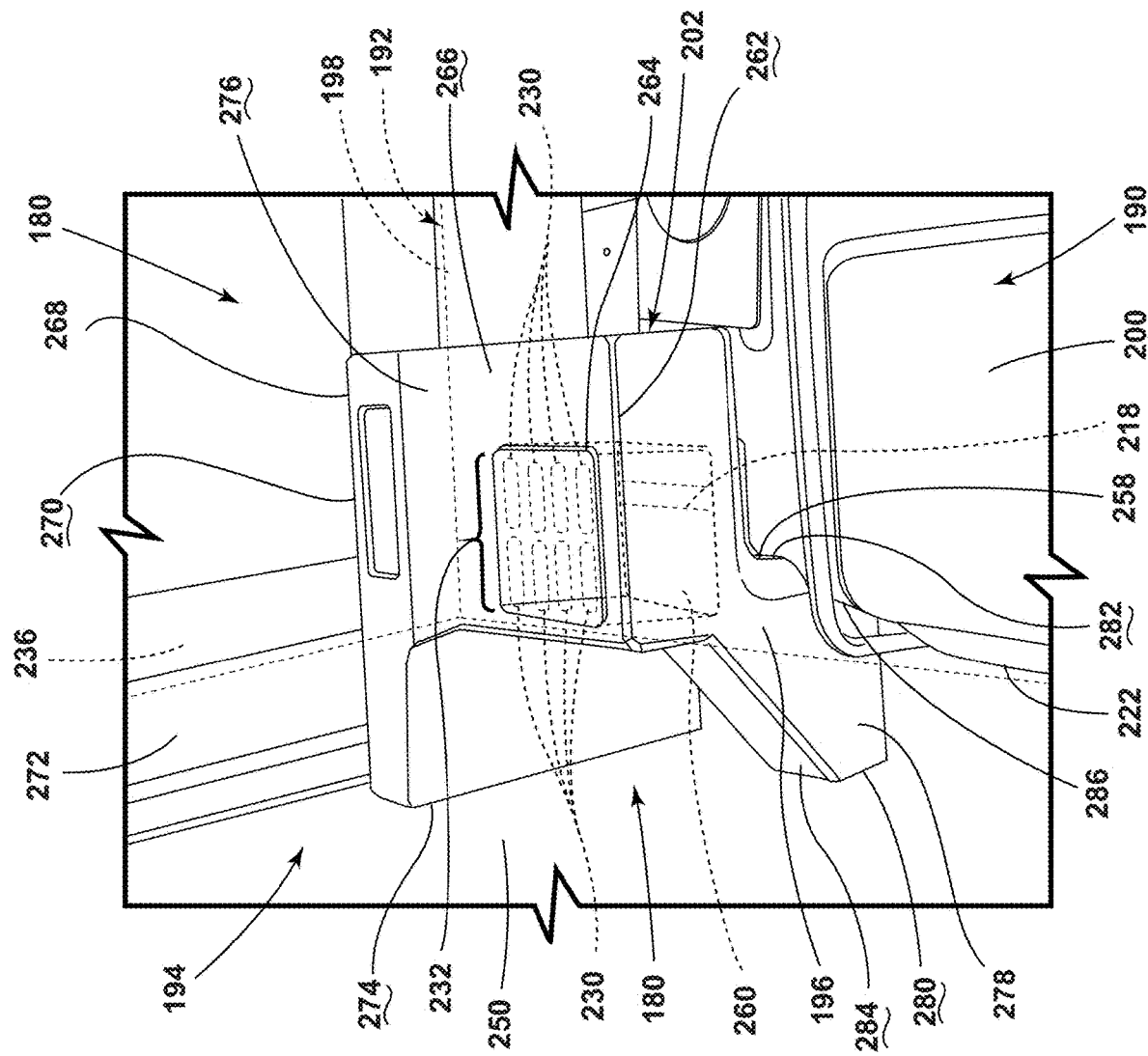
FIG. 16 is a top perspective view of a first air duct of an air flow assembly positioned between a freezer liner and a refrigeration liner, according to the present disclosure.
Figure 17:
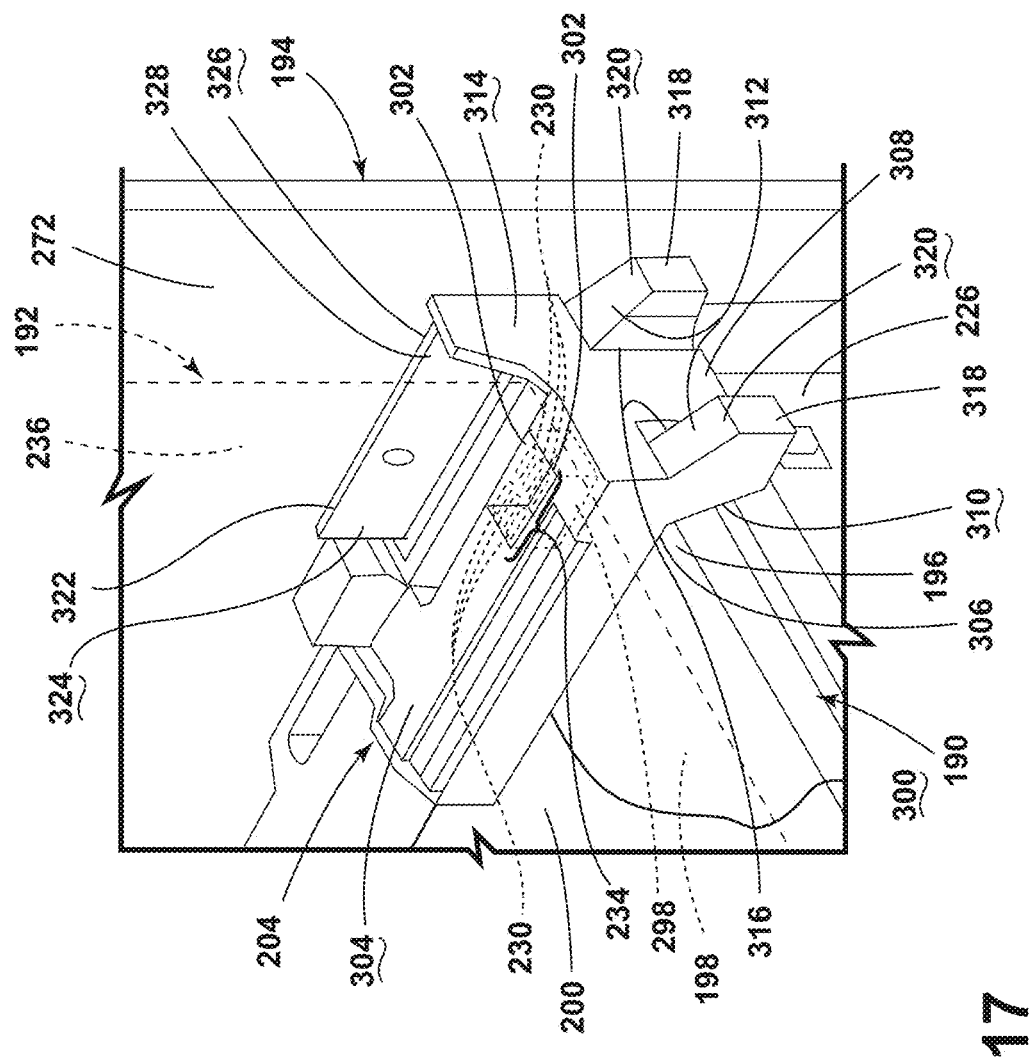
FIG. 17 is a top perspective view of a second air duct of an air flow assembly positioned between a freezer liner and a refrigeration liner, according to the present disclosure.
Figure 18:
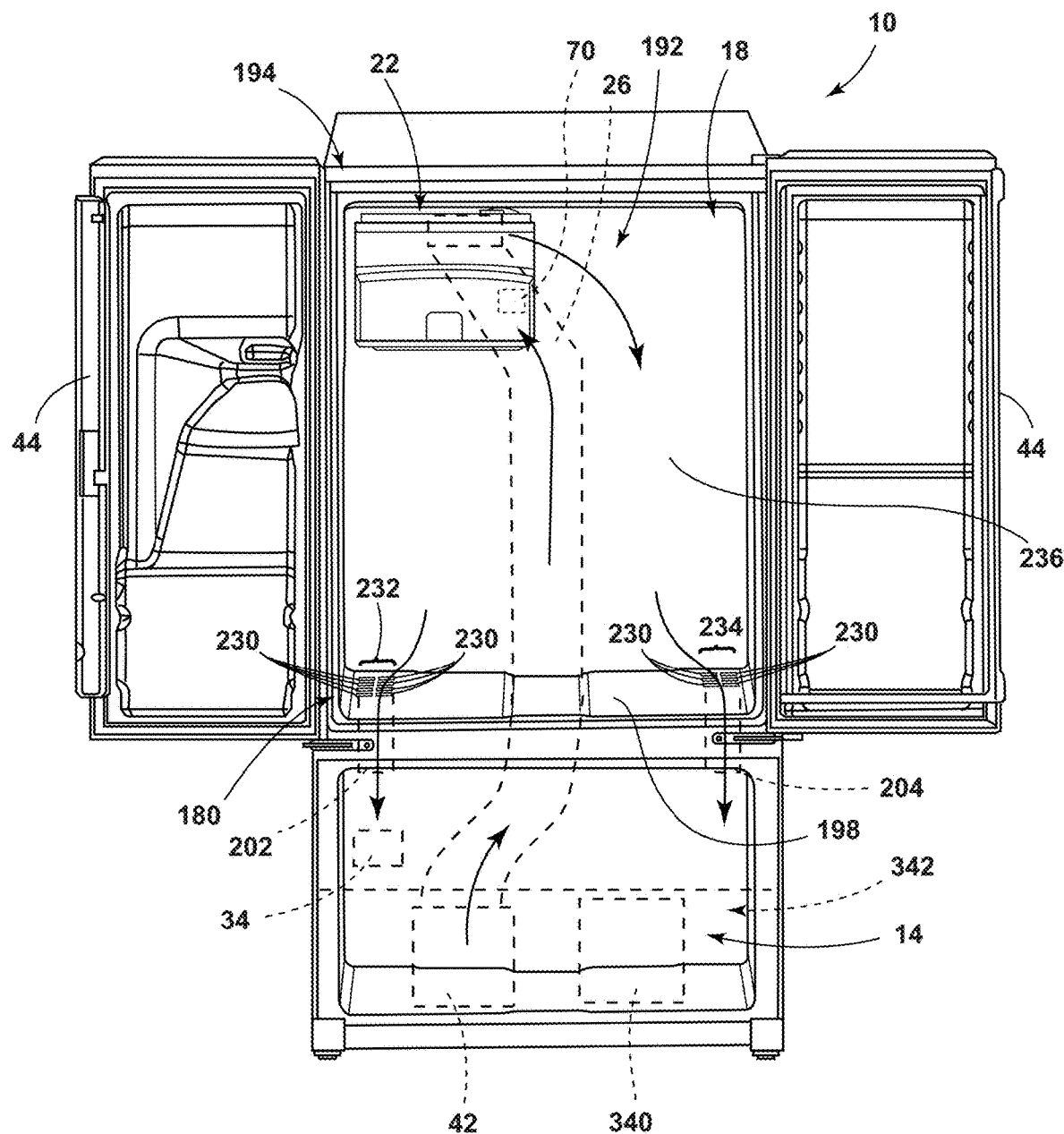
FIG. 18 is a schematic view of an airflow path through an air flow assembly of a refrigeration appliance, according to the present disclosure.

Referring to FIG. 16, as well as FIGS. 9-15, the first and second air ducts 202, 204 assist in providing air flow paths between the refrigeration compartment 18 and the freezer compartment 14. The first and second sets 232, 234 of slots 230 provide greater airflow from the refrigeration compartment 18. In operation, the ice maker fan 70 draws air from the freezer compartment 14 into the ice maker compartment 22 for ice making processes. As air is directed to the ice maker compartment 22, pressure within the ice maker compartment 22 may increase. With the increasing pressure, air leaks or escapes from the ice maker compartment 22 into the refrigeration compartment 18. This leaking air may increase the pressure within the refrigeration compartment 18 and may contribute to a negative pressure within the freezer compartment 14 relative to one or both of the refrigeration compartment 18 and an area external to the refrigeration appliance 10.

To equalize air flow, air pressure, and humidity within the freezer and refrigeration compartments 14, 18, air may pass through the slots 230, through one of the first and second air ducts 202, 204, through one of the apertures 218, 220, and into the freezer compartment 14. The additional air flow between the two compartments is advantageous for reducing the negative pressure within the freezer compartment 14. Negative pressure within the freezer compartment 14 may make opening the freezer door 48 more difficult. Further, the increased air flow to the freezer compartment 14 is advantageous for preventing or minimizing the external air from being drawn into the freezer compartment 14, which may result in frost buildup within the freezer compartment 14.

The first and second air ducts 202, 204 operate to fluidly connect the refrigeration compartment 18 with the freezer compartment 14. The first and second air ducts 202, 204 may be constructed of expanded polystyrene through an extrusion or molding process. The configuration of each the first and second air ducts 202, 204 may minimize movement of the air ducts 202, 204 once installed. Minimizing movement is advantageous for maintaining proper alignment between the slots 230 and the apertures 218, 220, respectively.

The refrigeration appliance 10 may include the air flow assembly 180 independent of or in combination with one or more of the ice maker return duct 30, the fan 38, the sensor 34, the external sensor 78, the adapter 130, and the splitter 134. Accordingly, the air flow assembly 180 may provide a more passive system that may operate without the fan 38 or in combination with the fan 38 to reduce a differential between the freezer compartment 14 and an area external to the refrigeration appliance 10 and between the freezer and refrigeration compartments 14, 18. However, it is contemplated that the fan 38 and the interconnected freezer and refrigeration compartments 14, 18 may each independently reduce or minimize the differential in condition within the freezer compartment 14 relative to the area external to the refrigeration appliance 10. As such, the fan 38 may be utilized without the air flow system 180 and the air flow system 180 may be utilized without the fan 38.

As previously set forth, the refrigeration appliance 10 may include the single evaporator 42 for cooling the refrigeration compartment 18 and the freezer compartment 14. In single evaporator 42 configurations, the evaporator 42 may provide cool air to both the freezer compartment 14 and the refrigeration compartment 18, thereby fluidly coupling the freezer and refrigeration compartments 14, 18. The freezer and refrigeration compartments 14, 18 may be fluidly coupled at one or more locations as the evaporator 42.

Referring still to FIGS. 9-15, in an alternative configuration, the refrigeration appliance 10 may include two evaporators 42, 340 that operate independently of one another. Accordingly, the evaporator 42 may cool the freezer compartment 14 and the second evaporator 340 may cool the refrigeration compartment 18. The evaporators 42, 340 may be disposed in a machine compartment 342 generally disposed proximate the freezer compartment 14 and defined by the freezer liner 190 and the outer wrapper 194. The two evaporators 42, 340 may provide better control of the temperatures within the freezer and refrigeration compartments 14, 18. The two evaporators 42, 340 may be advantageous for more precise or accurate temperature control with the interconnected freezer and refrigeration compartments 14, 18 provided by the air flow assembly 180. Generally, in conventional dual evaporator refrigerators, the two food compartments remain separate from one another to better regulate the temperatures of each food compartment. However, the air flow system 180 discloses herein provides for separate regulation of temperature between the freezer compartment 14 and the refrigeration compartment 18, as well air flow directly between the freezer compartment 14 and the refrigeration compartment 18 to reduce the differential in the condition between the freezer compartment 14 and the refrigeration compartment 18 and/or an area external to the refrigeration appliance 10.

Use of the present disclosure may offer a variety of advantages. Use of the fan 38 which is activated and deactivated based on sensed properties of the refrigeration appliance 10, may prevent unnecessary use of the fan 38. For example, by activating or running the fan 38 only when a sensed differential exists, the refrigeration appliance 10 may have a decreased noise and energy consumption. Additionally, use of the fan 38 within the ice maker return duct 30 reduces and/or eliminates the accumulation of frost and ice within the freezer compartment 14. Also, the addition of the fan 38 to the ice maker return duct 30 may allow for a low manufacturing cost solution which may be implemented in a variety of refrigeration appliance styles. Further, the present disclosure is a robust solution to negative pressure generation as the pressure can be equalized regardless of the usage pattern, condition of gaskets around the refrigeration appliance 10, alignment of the doors 44, 48, and/or other fault modes. Also, use of the present disclosure may reduce the amount of force used to open the refrigeration doors 44 and/or the freezer door 48. For example, by reducing the magnitude of the pressure differential between the freezer compartment 14 and the external environment, the force to open the freezer door 48 may be reduced. Such a reduction of force may be advantageous in allowing the refrigeration appliance 10 to meet regulations regarding minimum pull force on the doors 44, 48 while also minimizing the production of frost and ice within the freezer compartment 14.

Additionally, the fan 38 and the ice maker fan 70 may be operated concurrently to reduce the differential sensed within the freezer compartment 14. Further, the fan 38 and the ice maker fan 70 may be operated concurrently based on a protocol relating to ice making processes of the ice maker compartment 22. Also, the fan 38 may be installed after the initial manufacturing process and installed within the ice maker compartment 22. Additionally, the air flow assembly 180 may fluidly connect the freezer compartment 14 and the refrigeration compartment 18. The air flow assembly 180 may include the first and second air ducts 202, 204 for providing two separate air flow paths between the freezer compartment 14 and the refrigeration compartment 18. Moreover, air may flow between the freezer compartment 14 and the refrigeration compartment 18 to reduce a negative air pressure within the freezer compartment 14 and/or an increased air pressure with the refrigeration compartment 18. Further, the air flow assembly 180 may be used in combination with the sensor 34, the external sensor 78, the fan 38, the ice maker return duct 30, or a combination thereof to minimize a differential in conditions within the refrigeration appliance 10 and between the refrigeration appliance 10 and an area external thereto. Other benefits or advantages of using this device may also be realized and/or achieved.

According to at least one aspect, a refrigeration appliance includes a freezer compartment and an ice maker compartment. An ice maker return duct is fluidly coupled to the ice maker compartment and the freezer compartment and is configured to direct air from the ice maker compartment to the freezer compartment. An internal sensor is positioned within the freezer compartment and configured to sense a first condition within the freezer compartment. An external sensor is coupled to said refrigeration appliance and configured to sense a second condition external to said refrigeration appliance. A return fan is positioned within the ice maker return duct. A controller is operably coupled to the internal and external sensors to receive sensed first and second conditions. The controller is configured to determine a differential between the sensed first condition within the freezer compartment and the sensed second condition external to said refrigeration appliance. The controller activates the return fan to blow air from the ice maker compartment into the freezer compartment in response to the differential.

According to another aspect, the internal and external sensors are humidity sensors, and the first condition is an internal humidity within the freezer compartment and the second condition is an external humidity external to said refrigeration appliance.

According to still another aspect, the internal and external sensors are air flow sensors, and the first condition is an internal air flow within the freezer compartment and the second condition is an air flow external to said refrigeration appliance.

According to another aspect, an ice maker fan is operably coupled with ice maker compartment. A wiring harness is operably coupled to the ice maker fan. A splitter is coupled to the wiring harness. The splitter is coupled to each of the ice maker fan and the return fan, and the controller operates the ice maker fan and the return fan concurrently.

According to another aspect, a refrigeration liner defines a refrigeration compartment. A slot is defined in a bottom panel of the refrigeration liner. A freezer liner defines the freezer compartment. An aperture is defined in a top panel of the freezer liner. The slot and the aperture are in fluid communication to provide fluid communication between the refrigeration compartment and the freezer compartment.

According to another aspect, an air duct is disposed between the bottom panel of the refrigeration liner and the top panel of the freezer liner. The air duct extends between a side of the freezer liner and an outer wrapper.

According to another aspect, a magnitude of a fan speed of the return fan is based on a magnitude of the differential.

According to another aspect of the present disclosure, a refrigeration appliance includes an outer wrapper. A refrigeration liner is disposed within the outer wrapper and defines a refrigeration compartment. The refrigeration liner defines at least one first slot and at least one second slot. The at least one first slot is disposed proximate a first sidewall and the at least one second slot is disposed proximate a second sidewall. A freezer liner is disposed within the outer wrapper and defines a freezer compartment. The freezer liner defines a first aperture in fluid communication of the at least one first slot and a second aperture in fluid communication with the at least one second slot. A first air duct is fluidly coupled to the at least one first slot and the first aperture. A second air duct is fluidly coupled to the at least one second slot and the second aperture. An ice maker compartment is disposed within the refrigeration compartment. The ice maker compartment is in fluid communication with the freezer compartment. A machine compartment is defined at least partially by the outer wrapper. The machine compartment includes a first evaporator for cooling air within the freezer compartment and a second evaporator for cooling air within the refrigeration compartment.

According to another aspect, wherein each of the first and second air ducts are disposed in a space defined between the bottom panel of the refrigeration liner and the top panel of the freezer liner.

According yet to another aspect, the first air duct is disposed between a first sidewall of the freezer liner and a first sidewall of the outer wrapper. The second air duct is disposed between a second sidewall of the freezer liner and a second sidewall the outer wrapper.

According to still another aspect, an ice maker fan directs air to the ice maker compartment. A return fan directs air from the ice maker compartment to the freezer compartment.

According to another aspect, a controller is communicatively coupled with the ice maker fan and the return fan. The ice maker fan is in communication with the return fan.

According to another aspect, the controller operates the ice maker fan and the return fan concurrently via a pulse signal sent to the ice maker fan.

According to another aspect, an air pressure sensor is disposed within the freezer compartment for sensing an internal air pressure.

According to another aspect, a controller is communicatively coupled with the ice maker fan and the return fan. The controller activates the return fan in response to sensed air pressure within the freezer compartment received from the air pressure sensor.

According to another aspect, the at least one first slot includes a first set of slots and the at least one second slot includes a second set of slots.

According to another aspect, the first air duct abuts the refrigeration liner and has an opening that extends around the first set of slots. The second air duct abuts the refrigeration liner and has an opening that extends around the second set of slots.

According to another aspect, a method of servicing a refrigeration appliance includes removing an ice maker compartment to access a wiring harness. An ice maker fan is disconnected from the wiring harness. A Y-splitter is coupled to the wiring harness. An ice maker fan and a return fan are coupled to the wiring harness. An air pressure differential is sensed between a freezer compartment and an area external to said refrigeration appliance; and activating the ice maker fan and the return fan.

According to another aspect, the ice maker fan and the return fan are deactivated when an air pressure within the freezer compartment is equal to or greater than an air pressure external to said refrigeration appliance.

According to another aspect, a fan speed is adjusted in response to the air pressure differential.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A refrigeration appliance, comprising:
an outer wrapper;
a refrigeration liner disposed within the outer wrapper and defining a refrigeration compartment, wherein the refrigeration liner defines at least one first slot and at least one second slot, and wherein the at least one first slot is disposed proximate a first sidewall and the at least one second slot is disposed proximate a second sidewall;
a freezer liner disposed within the outer wrapper and defining a freezer compartment, wherein the freezer liner defines a first aperture in fluid communication with the at least one first slot and a second aperture in fluid communication with the at least one second slot;
a first air duct fluidly coupling the at least one first slot and the first aperture, wherein the first air duct includes a first air duct rear extension that extends downward of the first aperture to define a receiving space for the freezer liner and includes a rear surface that abuts a rear wall of the outer wrapper and a side surface that abuts a first sidewall of the outer wrapper;
a second air duct fluidly coupling the at least one second slot and the second aperture, wherein the second air duct includes a second air duct rear extension that extends downward of the second aperture to define a receiving space for the freezer liner and includes a rear surface that abuts the rear wall of the outer wrapper;
an ice maker compartment disposed within the refrigeration compartment, wherein the ice maker compartment is in fluid communication with the freezer compartment; and
a machine compartment defined at least partially by the outer wrapper, wherein the machine compartment includes a first evaporator for cooling air within the freezer compartment and a second evaporator for cooling air within the refrigeration compartment.

2. The refrigeration appliance of claim 1, wherein each of the first and second air ducts are disposed in a space defined between a bottom panel of the refrigeration liner and a top panel of the freezer liner.

3. The refrigeration appliance of claim 1, wherein the first air duct is disposed between a first sidewall of the freezer liner and the first sidewall of the outer wrapper, and wherein the second air duct is disposed between a second sidewall of the freezer liner and a second sidewall the outer wrapper.

4. The refrigeration appliance of claim 1, further comprising:
   an ice maker fan directing air to the ice maker compartment; and
   a return fan directing air from the ice maker compartment to the freezer compartment.

5. The refrigeration appliance of claim 4, further comprising:
   a controller communicatively coupled with the ice maker fan and the return fan, wherein the ice maker fan is in communication with the return fan.

6. The refrigeration appliance of claim 5, wherein the controller operates the ice maker fan and the return fan concurrently via a pulse signal sent to the ice maker fan.

7. The refrigeration appliance of claim 4, further comprising:
   an air pressure sensor disposed within the freezer compartment for sensing an internal air pressure.

8. The refrigeration appliance of claim 7, further comprising:
   a controller communicatively coupled with the ice maker fan and the return fan, wherein the controller activates the return fan in response to sensed air pressure within the freezer compartment received from the air pressure sensor.

9. The refrigeration appliance of claim 1, wherein the at least one first slot includes a first set of slots and the at least one second slot includes a second set of slots.

10. The refrigeration appliance of claim 9, wherein the first air duct abuts the refrigeration liner and has an opening that extends around the first set of slots, and wherein the second air duct abuts the refrigeration liner and has an opening that extends around the second set of slots.

11. The refrigeration appliance of claim 1, wherein the second air duct rear extension extends into an indent defined on a bottom panel of the refrigeration liner.

12. The refrigeration appliance of claim 1, wherein the first air duct includes a first air duct side section that extends between the first sidewall of the outer wrapper and a first sidewall of the freezer liner, and wherein the first air duct side extension defines a truncated shape.

13. The refrigeration appliance of claim 1, wherein the first air duct includes a first air duct side section that extends between the first sidewall of the outer wrapper and a first sidewall of the freezer liner and the second air duct includes a second air duct side extension that extends between a second sidewall of the outer wrapper and a second sidewall of the freezer liner.

* * * * *